US012629633B1

(12) United States Patent
Delnero et al.

(10) Patent No.: US 12,629,633 B1
(45) Date of Patent: May 19, 2026

(54) LEAKY RADIO FREQUENCY FLUID-SUBSTRATE INTERACTION VESSEL

(71) Applicant: Lockheed Martin Corporation, Bethesda, MD (US)

(72) Inventors: Christopher C. Delnero, Lakewood, CO (US); Arun Kumar Bhattacharyya, Rancho Palos Verdes, CA (US); Clifton Carthelle Courtney, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 809 days.

(21) Appl. No.: 17/902,380

(22) Filed: Sep. 2, 2022

(51) Int. Cl.
| | |
|---|---|
| *B01D 53/62* | (2006.01) |
| *B01D 53/04* | (2006.01) |
| *B01D 53/82* | (2006.01) |
| *B01D 53/96* | (2006.01) |
| *B64G 1/46* | (2006.01) |

(52) U.S. Cl.
CPC ......... B01D 53/62 (2013.01); B01D 53/0438 (2013.01); B01D 53/82 (2013.01); B01D 53/96 (2013.01); *B01D 2253/108* (2013.01); *B01D 2253/116* (2013.01); *B01D 2257/504* (2013.01); *B01D 2259/40098* (2013.01); *B01D 2259/4575* (2013.01); *B64G 1/46* (2013.01)

(58) Field of Classification Search
None
See application file for complete search history.

(56) References Cited

U.S. PATENT DOCUMENTS

| | | | | |
|---|---|---|---|---|
| 4,322,394 A | * | 3/1982 | Mezey | .................... C01B 17/60 |
| | | | | 423/244.01 |
| 4,348,362 A | | 9/1982 | Foss | |
| 4,421,651 A | * | 12/1983 | Burkholder | ............ B01D 53/04 |
| | | | | 502/56 |
| 5,282,886 A | * | 2/1994 | Kobayashi | ........... B01D 53/323 |
| | | | | 95/131 |
| 6,022,399 A | | 2/2000 | Ertl et al. | |
| 6,296,823 B1 | | 10/2001 | Ertl et al. | |
| 9,359,867 B2 | | 6/2016 | Pennewitz et al. | |
| 2005/0024284 A1 | * | 2/2005 | Halek | .................... H01Q 13/12 |
| | | | | 343/771 |

(Continued)

FOREIGN PATENT DOCUMENTS

DE    202008012371 U1 * 12/2008    .............. B01J 20/06

OTHER PUBLICATIONS

Translation of DE202008012371U1 (Year: 2008).*

(Continued)

*Primary Examiner* — Jennifer Dieterle
*Assistant Examiner* — Phillip Y Shao

(57) ABSTRACT

Provided herein are various enhanced assemblies and techniques for reaction apparatuses that employ leaky radio frequency (RF) conduits. In one example, an apparatus includes a substrate and a leaky RF conduit. The substrate comprises properties selected to achieve a designated interaction process with a fluid. The leaky RF conduit is configured to leak RF energy external to the RF conduit radially along its longitudinal axis via apertures in the RF conduit. The leaked RF energy energizes the substrate to affect the designated interaction process as the fluid passes through the substrate.

20 Claims, 22 Drawing Sheets

(56) References Cited

U.S. PATENT DOCUMENTS

| | | | |
|---|---|---|---|
| 2005/0115253 A1* | 6/2005 | Sienel | F25B 9/008 62/149 |
| 2010/0000852 A1* | 1/2010 | Curtin | B01D 53/32 422/186 |
| 2010/0204043 A1* | 8/2010 | Cho | B01D 53/02 502/400 |
| 2014/0144321 A1* | 5/2014 | Sawamura | B01D 53/1493 96/4 |
| 2015/0147252 A1* | 5/2015 | Sawamura | B01D 53/1425 423/228 |

OTHER PUBLICATIONS

Cmarik, Gregory E. et al., "CO2 Removal Onboard The International Space Station—Material Selection And System Design," 49th International Conference on Environmental Systems, 7 pages, Jul. 7-11, 2019.

Sherif, Dina El et al., "International Space Station Carbon Dioxide Removal Assembly (ISS CDRA) Concepts And Advancements," 5 pages, 2005.

* cited by examiner

400

401
PASS FLUID THROUGH A FLUID INLET PORT, THROUGH A SUBSTRATE CHAMBER, AND OUT A FLUID OUTLET PORT TO ACHIEVE A DESIGNATED INTERACTION BETWEEN THE FLUID AND THE SUBSTRATE

*first phase of operation*

402
LEAK RF ENERGY RADIALLY ALONG A LONGITUDINAL AXIS OF AN RF CONDUIT TO ENERGIZE THE SUBSTRATE TO AFFECT THE DESIGNATED INTERACTION

*second phase of operation*

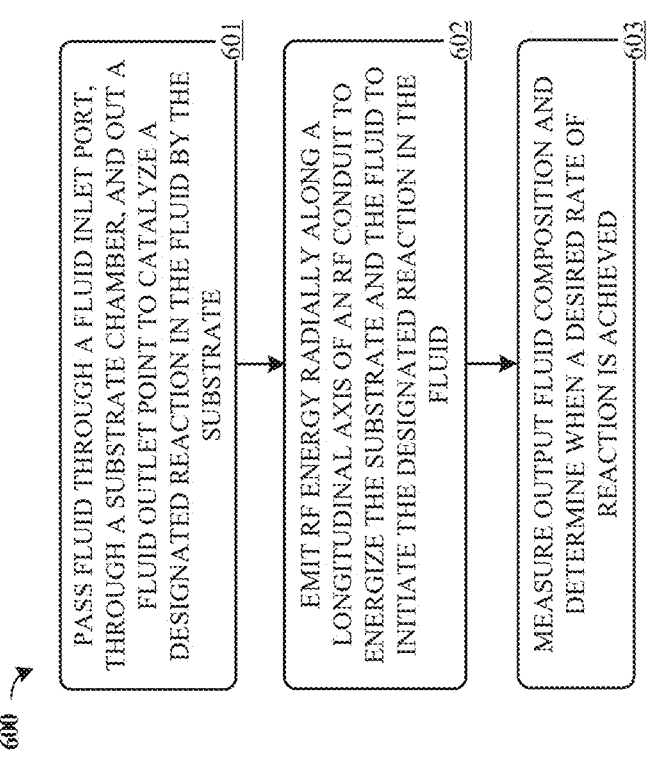

600

601

PASS FLUID THROUGH A FLUID INLET PORT, THROUGH A SUBSTRATE CHAMBER, AND OUT A FLUID OUTLET POINT TO CATALYZE A DESIGNATED REACTION IN THE FLUID BY THE SUBSTRATE

602

EMIT RF ENERGY RADIALLY ALONG A LONGITUDINAL AXIS OF AN RF CONDUIT TO ENERGIZE THE SUBSTRATE AND THE FLUID TO INITIATE THE DESIGNATED REACTION IN THE FLUID

603

MEASURE OUTPUT FLUID COMPOSITION AND DETERMINE WHEN A DESIRED RATE OF REACTION IS ACHIEVED

FIGURE 6 side view A side view B

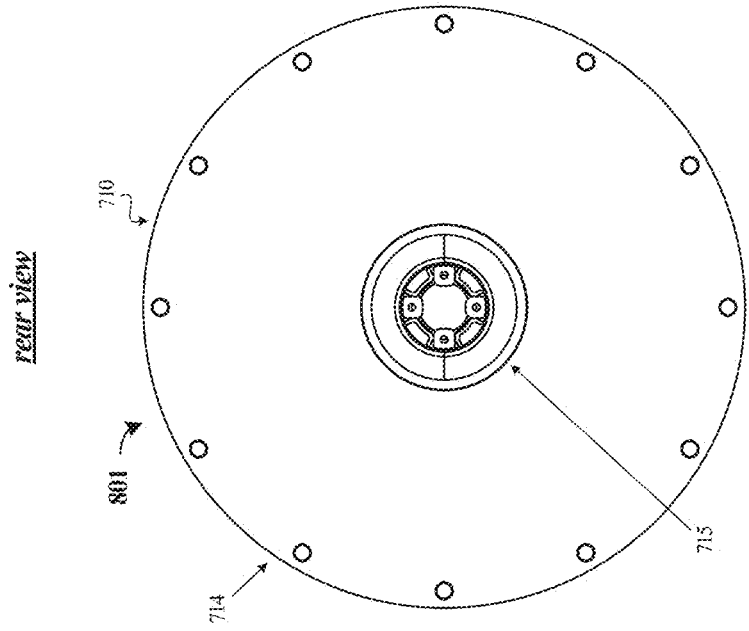
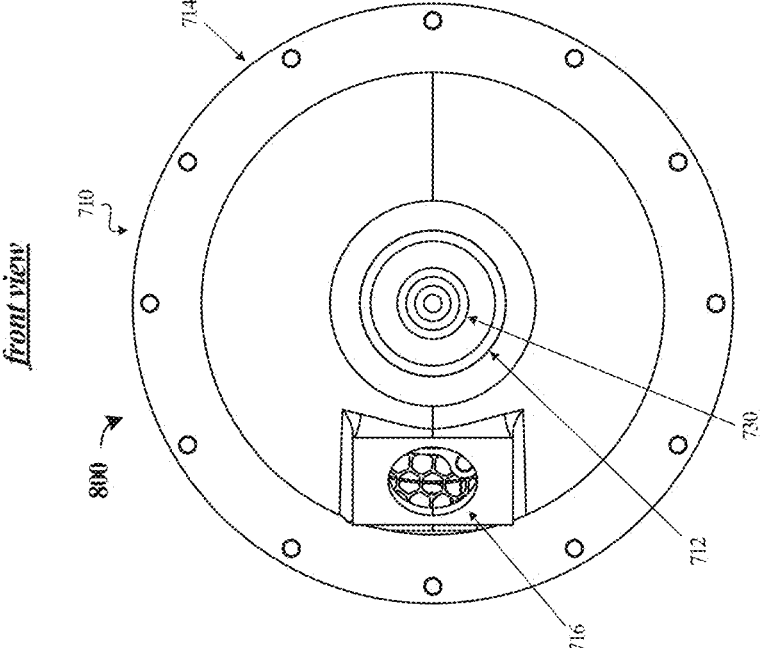
FIGURE 8

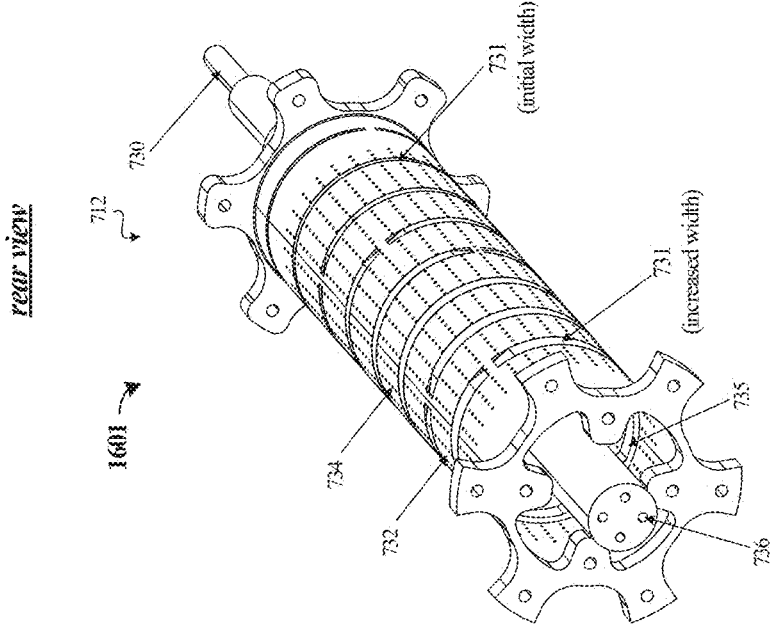
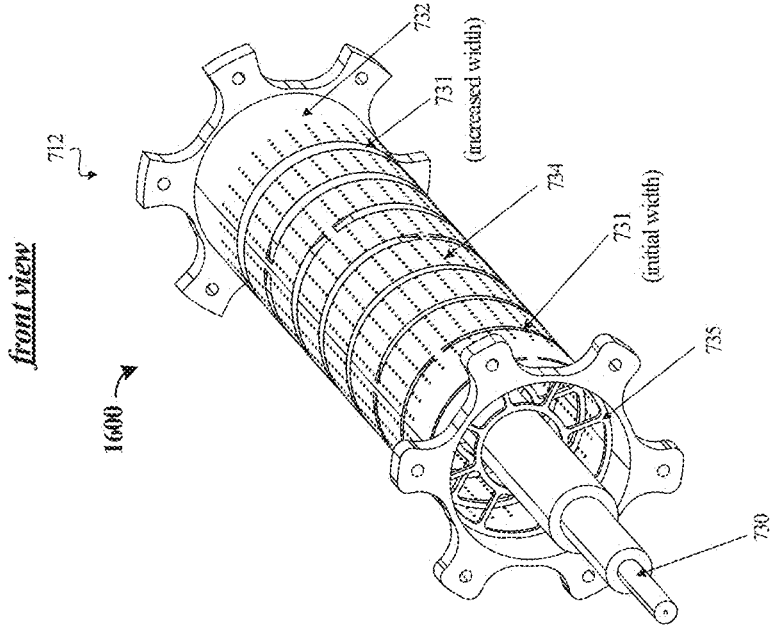
FIGURE 16

LEAKY RADIO FREQUENCY
FLUID-SUBSTRATE INTERACTION VESSEL

TECHNICAL BACKGROUND

Gas separation systems are employed to remove one or more components of a gas from a bulk fluid or selectively separate components from each other. In one example, gas separation systems can be used to remove carbon dioxide from beathing air, such as in spacecraft or other human habitation environments. Such air environments typically are composed of nitrogen ($N_2$), oxygen ($O_2$), and water vapor ($H_2O$), along with various trace gases including $CO_2$ and argon (Ar). However, because carbon dioxide comprises a small mass percentage of air (i.e. 0.5%), selective collection and separation of the carbon dioxide from the other components is mechanically difficult and energy intensive. Human spacecraft $CO_2$ control requires significant consumables, such as found in various missions including Apollo, Shuttle, CST-100, Orion, and the International Space Station (ISS), significant mass (ISS and Orion), as well as significant maintenance time (ISS) and power (ISS).

To selectively collect the carbon dioxide, gas separation systems might utilize zeolite materials to pull the carbon dioxide from the air. Zeolite materials are a class of materials formed from ceramic clays with chemical characteristics that allow targeted substances, such as carbon dioxide, to adsorb to the zeolite while inhibiting other substances, like oxygen and nitrogen, from adsorbing. This selective adsorption can be employed to effectively filter carbon dioxide out of bulk air. As these gas separation systems operate, the zeolite eventually becomes saturated and its capacity diminishes to adsorb additional targeted substances, such as carbon dioxide. Many zeolites used for carbon dioxide removal purposes will also adsorb water molecules in the air, which further reduces the adsorption capacity of the zeolite to filter out carbon dioxide. Thus, such gas separation systems must periodically flush the adsorbed carbon dioxide and water from the zeolite to regenerate the adsorption capacity of the zeolite.

To desorb the carbon dioxide and water, the gas separation systems heat the zeolite to an elevated temperature allowing the carbon dioxide and water vapor to exit the system. Unfortunately, many zeolites are thermally insulating materials, and the energy requirements to heat such zeolites can be excessive. These thermally insulating zeolites have a limited ability to transfer heat which results in an uneven temperature distribution within the bulk zeolite. To counteract these problems, the gas separation systems heat the zeolite to a temperature far in excess of what is required to desorb a target material, such as carbon dioxide and water mentioned above. The excessive heating damages the zeolite which degrades the performance of the gas separation systems over time.

Typical power consumption for such zeolite systems is greater than 1000 Watts (W) of continuous operating power and greater than 200° C. zeolite temperatures to periodically remove parasitic water vapor that poisons $CO_2$ absorption efficiency. This high-power requirement is significant in many applications. For example, the high-power requirement represents >20% of the total Orion vehicle power load, and the >200° C. temperatures have caused material degradation issues on first-generation zeolite $CO_2$ removal systems (e.g., Carbon Dioxide Removal Assembly (CDRA)) employed on the ISS. Current ISS CDRA operations require 1100 W on average and 1500 W peak to operate with a heater temperature up to 350° C. Second generation systems (e.g., 4BCO2) are being tested on the ISS, but still require 975 W on average with peak usage of 1350 W and 200° C. $H_2O$ desorption temperature. System power in these examples is driven by both heater power and fan power/system pressure drop.

OVERVIEW

Provided herein are various enhanced assemblies and techniques for reaction apparatuses that employ leaky radio frequency (RF) conduits. To address power, mass, and reliability issues, the gas separations described herein can employ zeolites combined with a "leaky waveguide" configuration to facilitate RF excitation and heating of the zeolite during the system's $CO_2/H_2O$ desorption phase which allows energy to be injected directly into the atomic bond between the zeolite and $CO_2/H_2O$ molecules. This leaky waveguide, having a coaxial zeolite bed, significantly reduces the airflow pressure drop of the system (e.g., lower fan power), requires less energy (~½ of tradition heaters), and requires lower temperatures to desorb $H_2O$ and $CO_2$ from the zeolite. In addition, these leaky RF techniques can be applied to various other reaction apparatuses and materials/fluids, as will be discussed in the various example implementations.

In a first example, an apparatus includes a substrate having properties selected to achieve a designated interaction process with a fluid. The apparatus also includes a leaky radio frequency (RF) conduit configured to leak RF energy external to the RF conduit radially along a longitudinal axis and energize the substrate to affect the designated interaction process as the fluid passes through the substrate via pores in the RF conduit.

In another example, a method includes passing a fluid through a substrate that has properties selected to achieve a designated interaction process with the fluid. The method also includes emitting RF energy through an outer conductor of a leaky radio frequency (RF) conduit radially along a longitudinal axis to energize the substrate to affect the designated interaction process as the fluid passes through the substrate via pores in the leaky RF conduit.

In yet another example, a system includes a substrate having a longitudinal axis and a radial thickness, and a leaky coaxial radio frequency (RF) conduit disposed within the substrate along the longitudinal axis and having pores configured to pass a fluid into the substrate. The system also includes a controller configured to introduce a fluid into an end of the coaxial leaky RF conduit for penetration through the leaky coaxial RF conduit and into the radial thickness of the substrate, where the fluid interacts with the substrate to alter composition of the fluid. The controller is configured to detect a saturation threshold condition of the substrate with respect to the fluid, and responsively initiate an RF energizing of the substrate by way of a radial RF emission from the leaky coaxial RF conduit and reduce the saturation threshold condition of the substrate.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 6 illustrates an operation of a fluid reaction apparatus in an implementation.

FIG. 8 illustrates views of a fluid reaction apparatus in an implementation.

FIG. 16 illustrates views of a fluid reaction apparatus in an implementation.

DETAILED DESCRIPTION

Figure 1:
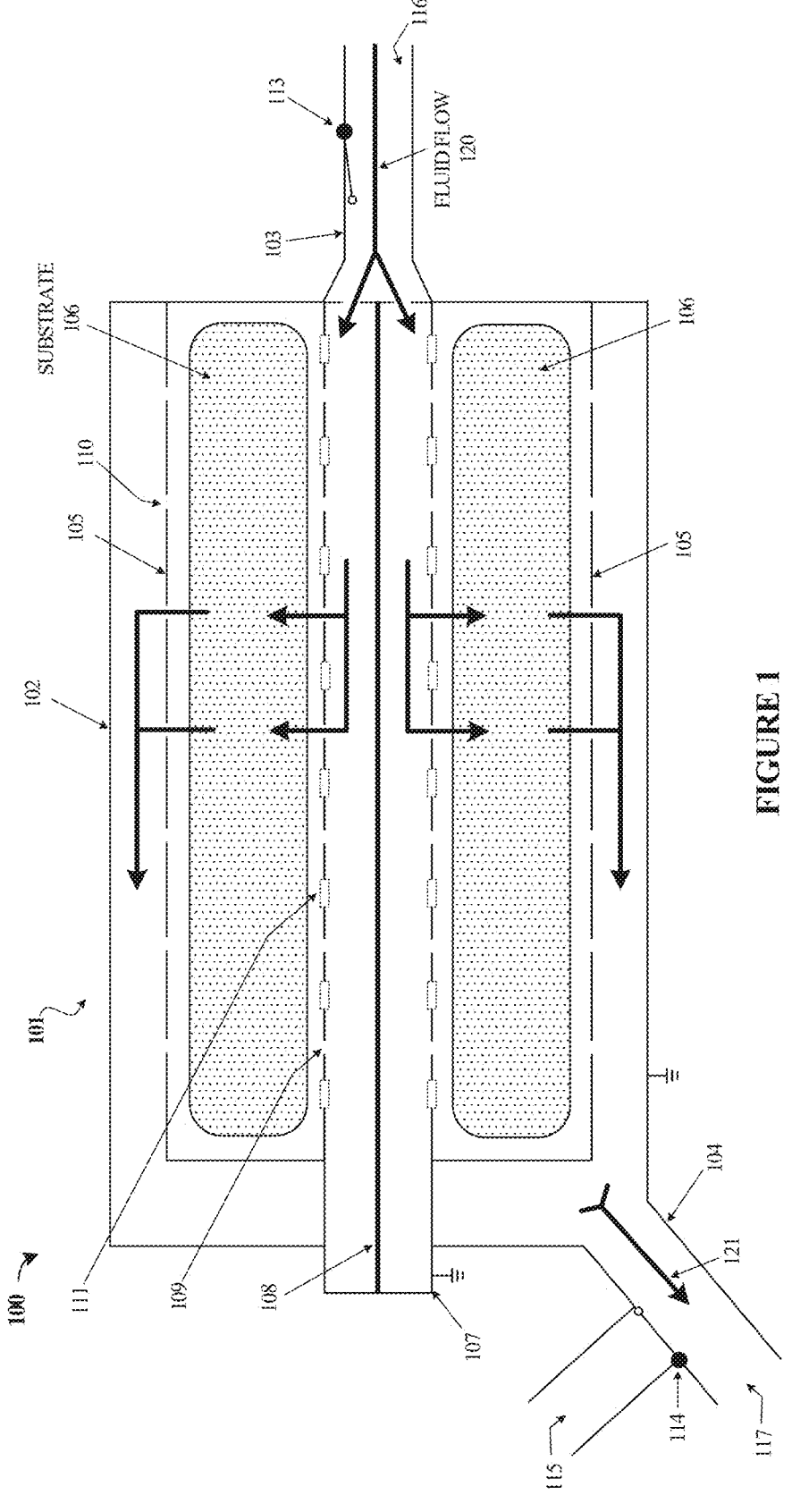
FIG. 1 illustrates a schematic view of a fluid reaction apparatus in an implementation.

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

The examples herein present fluid interaction or reaction apparatuses or vessels to affect designated interactions between fluids and substrates. In these examples, a reaction substrate can form a reaction bed (or interaction bed) that is external to a central longitudinal RF conduit. The reaction substrate is selected as having properties to achieve a designated interaction process with a fluid is passed through the substrate. Exemplary designated interaction processes include fluid separation, adsorption/desorption, and reaction catalysis, among others. The central RF conduit receives RF energy and radially leaks the RF energy along its longitudinal axis into the substrate. The leaked RF energy propagates radially throughout the substrate. The leaked RF energy energizes the substrate to affect the designated interaction process between the substrate and the fluid. It should be noted that this arrangement differs greatly from conventional designs which inject RF energy longitudinally down along an axis of a substrate bed which is disposed within the RF conduit itself. The examples herein inject RF energy radially through a substrate bed which is disposed external to an RF conduit. Advantageously, due to the radial propagation of the leaked RF energy, a more even temperature distribution and lower required energy input as compared to traditional resistive heaters is achieved in the substrate. The examples herein provide for various desirable characteristics, such as reduced power requirements, reductions in temperatures to affect the designated process, smaller sizes, and lower fluid pressures.

The examples detailed herein address power, mass, and reliability issues for gas separation processes that include zeolite-based substrate beds. Specifically, the apparatuses described herein utilize "leaky waveguide" configurations to facilitate RF heating of the zeolite during a desorption phase which allows energy to be injected directly into the atomic bond between the zeolite and adsorbed/absorbed molecules. This leaky waveguide arrangement with a coaxial or annular zeolite bed significantly reduces the airflow pressure drop of the system (i.e., lower fan power), requires less energy (~½ of traditional heaters), and requires lower temperatures to desorb materials from the zeolite. This system incorporates a bed geometry which can be tailored for the specific zeolite formulas, water loading, $CO_2$ loading, process absorption/desorption durations, RF frequencies, and RF powers. Due to the coaxial or annular bed configuration, system pressure drops will be minimized, and zeolite mass participation will be maximized leading to a lower mass system. Highly reliable solid state RF transmitters will typically have higher operational reliability than traditional high power resistance heaters. Moreover, efficient $CO_2$ gas separation from breathing air is a key enabler and discriminator for all long duration (>21 day) human space flight offerings. The examples herein inject RF energy directly into the bond between $CO_2/H_2O$ and the zeolite lattice minimizing parasitic heater power. The examples herein allow for a radial or annular zeolite bed that will have lower pressure drop than traditional packed zeolite beds.

In a first example implementation, FIG. 1 is presented. FIG. 1 includes schematic view 100. Schematic view 100 is a block diagram depicting fluid reaction apparatus 101. Fluid reaction apparatus 101 comprises housing 102, fluid inlet port 103, fluid outlet port 104, substrate chamber 105, substrate 106, leaky RF conduit 107, center conductor 108, conduit pores 109, chamber pores 110, RF windows 111, inlet valve 113, outlet valve 114, vacuum line 115, inlet fluid flow 120, and outlet fluid flow 121.

Housing 102 comprises an enclosure or chassis to provide structural support to the elements of fluid reaction apparatus 101 and provide pathways for fluid flow 120 to move through housing 102 from inlet port 103, achieve a designated interaction with substrate 106, and exit via outlet port 104. Housing 102 may be constructed from aluminum, steel, plastic, composite materials, or some other type of material to house the other elements of fluid reaction apparatus 101. Housing 102 may comprise additional thermal insulation (not illustrated), such as a thermal blanket, to thermally insulate substrate 105. Housing 102 may also include various elements to mechanically, electrically, or thermally isolate contact of housing 102 with external systems. Inlet port 103 and outlet port 104 allow fluid flow 120 to enter and exit housing 102. Inlet valve 113 controls inlet fluid flow 120 through fluid line 116 and outlet valve 114 controls outlet fluid flow 121 through fluid line 117. Inlet valve 113 may selectively close fluid line 116, and outlet valve 114 may selectively close fluid line 117 and open vacuum line 115 when establishing a vacuum within housing 102 during a desorption configuration. Ports 103 and 104 may comprise additional components including additional valves, filters, flowrate sensors, and the like to control and monitor fluid flow 120. For example, outlet port 104 may comprise a gas analyzer to measure the concentration of a constituent gas at the outlet (e.g., amount of carbon dioxide) in fluid flow 120. Other inline elements might couple external to housing 102 for management, routing, handling, and other processing of fluids.

Fluid flow 120 may comprise a gas, a liquid, or supercritical fluid, among other types of flowable materials. For example, fluid flow 120 may comprise pressurized air. For purposes of this discussion, air can refer to various fluid configurations comprising corresponding percentages or partial pressures of nitrogen, oxygen, moisture, and carbon dioxide, among other constituents, impurities, pollutants, and particulates. Fluid flow 120 enters housing 102 via inlet port 103. Fluid flow 120 passes within leaky RF conduit 107 and enters substrate chamber 105 through conduit pores 109. Fluid flow 120 undergoes a designated interaction with substrate 106. For example, the designated interaction may comprise a chemical reaction, chemical adsorption, physical adsorption, catalysis, and/or another type of chemical/physical interaction between substrate 105 and fluid flow 120. Fluid flow 120 passes out of substrate chamber 105 and exits housing 102 via outlet port 104.

Substrate chamber 105 comprises an annular volume or cavity which houses substrate 106. Substrate chamber 105 may comprise perforated chamber walls (inner and outer) that holds substrate 105 and allows fluid flow 120 to pass through chamber 105. Conduit pores 109 and chamber pores 110 are permeable to fluid flow 120 and generally impermeable to substrate 106. For example, substrate 106 may comprise a particulate matter and conduit pores 109 and chamber pores 110 may be sized to prevent the particulate matter from escaping substrate chamber 105 and allow molecules or atoms comprising fluid flow 120 to pass through substrate chamber 106.

Substrate 106 is selected for having properties to achieve the designated interaction process with fluid flow 120. Substrate 106 forms a reaction bed of a porous absorbent/adsorbent medium. Substrate 106 may comprise a molecular sieve, a chemical reactant, a catalyst, or some other type of material to achieve the designated interaction process. Exemplary materials that may comprise substrate 106 include molecular sieves like zeolites, ceramic clays, silica gel, activated carbon, porous glass, and catalysts like iron (Fe), nickel (Ni), molybdenum Zeolite Socony Mobil-5 (Mo/ZSM-5), copper iron oxide ($CuFe_2O_4$), copper (Cu), nickel disulfide ($NiS_2$), cobalt (Co), protonic ZSM-5 (HZSM-5), and/or other types of sieves and catalysts. For example, substrate 106 may comprise zeolite 13X, fluid flow 120 may comprise air, and the designated interaction process may comprise the adsorption/desorption of carbon dioxide ($CO_2$) onto the zeolite to separate the carbon dioxide from the air. Other interactions might be performed based on the substrate materials selected, fluids employed, and geometries of the reaction apparatus.

Figure 2:
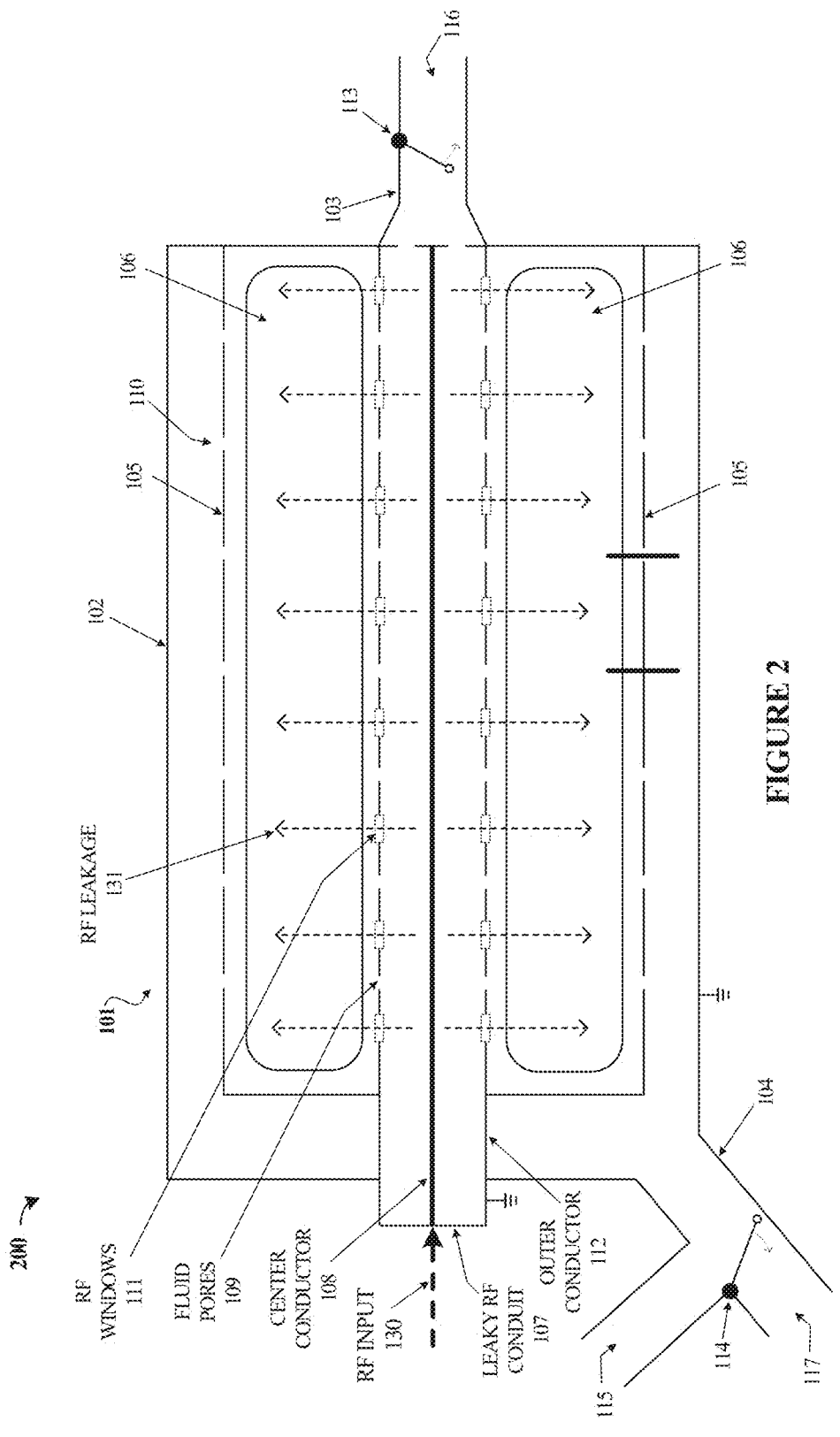
FIG. 2 illustrates a schematic view of a fluid reaction apparatus in an implementation.

FIG. 2 includes schematic view 200 of fluid reaction apparatus 101. Schematic view 200 is a block diagram depicting an additional view of fluid reaction apparatus 101. In this view, fluid reaction apparatus 101 includes RF input 130 and RF leakage 131. Leaky RF conduit 107 comprises a coaxial conduit formed from center conductor 108 and outer conductor 112. Outer conductor 112 includes conduit pores 109 and RF windows 111. Leaky RF conduit 107 may comprise a coaxial cable, RF waveguide, leaky feeder, or some other type of RF transmission medium capable of transmitting RF energy down center conductor 108 and radially leaking RF energy into substrate chamber 105. In some examples, center conductor 107 is omitted, such as in RF waveguide configurations.

Leaky RF conduit 107 receives RF input 130. For example, RF input 130 may comprise RF energy of a designated wavelength, frequency, or range thereof, carried into conduit 107 via center conductor 108. RF conduit 107 operates in a 'leaky' mode of operation, which refers to a configuration having RF windows 111 disposed along a longitudinal extent of RF conduit 107 which emit or 'leak' RF energy radially from such RF windows 111. RF windows 111 are distributed along the corresponding longitudinal extent of RF conduit 107 and are permeable to at least a portion of RF input 130 and allow RF input 130 to leak into substrate chamber 105 as RF leakage 131. Thus, RF conduit 107 leaks RF energy as RF leakage 131 radially into substrate chamber 105 along the longitudinal axis of RF conduit 107 via the RF windows in RF conduit 107. RF windows 111 in RF conduit 107 may comprise slits, apertures, or other radial openings configured to leak RF energy from center conductor 108 into substrate chamber 105. Various dielectric supports can ensure structural support of RF conduit 107 with respect to center conductor 108, as well as fill in the apertures forming the RF windows to prevent fluid flow through the RF windows or incursion of substrate 106 into RF conduit 107. Instead, fluid flow is directed through conduit pores 109, as seen in FIG. 1. While in many examples RF windows and conduit pores 109 are separate sets of apertures, some examples may include conduit pores 109 within at least a portion of the RF windows. When coaxial conduit arrangements are employed, RF windows 111 might include dielectric coverings, such as a non-conductive jacket of the cable, various dielectric tapes or fills (e.g., Kapton or polyamide), or can be formed from dielectric radial support structures maintaining a separation between center conductor 108 and outer conductor 112.

RF leakage 131 enters substrate chamber 105 and energizes substrate 106. The outer walls of substrate chamber 105 can be impermeable or semi-permeable to RF leakage 131 and may reflect unabsorbed RF energy back into substrate 106 to inhibit RF leakage 131 from exiting chamber 105 without energizing substrate 106. For example, substrate chamber 105 may comprise an aluminum casing that is configured to reflect RF energy that enters chamber 105. The energization of substrate 106 affects the designated interaction process between fluid flow 120 (not illustrated) and substrate 106. If the designated interaction comprises an adsorption/desorption process, RF leakage 131 heats substrate 105 to desorb the adsorbed component. Valves 113 and 114 may be closed with respect to fluid lines 116-117 and a vacuum established through vacuum line 115 in a desorption configuration to stop fluid flow 120 and remove the desorbed component. If the designated interaction comprises reaction catalysis, RF leakage 131 heats substrate 105 and fluid flow 120 to provide activation energy to initiate the chemical reaction. The frequency of the RF energy comprising RF input 130 transmitted via center conductor 108 is tuned so that the radial decay of the RF leakage propagates evenly throughout substrate chamber 105. Typically, as the frequency of the RF energy decreases, the size of substrate chamber 105 increases to account for the change in radial decay of RF leakage 131. RF input 130 supplied along center conductor 108, leaked into substrate chamber 105 as RF leakage 131, and absorbed by substrate 106 form a matching network to inhibit RF reflection towards the RF source. Advantageously, fluid reaction apparatus 101 radially leaks RF energy into substrate 106 to efficiently heat substrate 106. By radially leaking RF energy into substrate 106, the RF energy is distributed evenly through substrate chamber 105 which results in even heat distribution in substrate 106.

In some examples, fluid reaction apparatus 101 may comprise (or be externally coupled to) RF elements that conductively couple to RF input 130, including RF transmitters, oscillators, power amplifiers, filters, resonators, impedance matching networks, and various interconnect elements. The various interconnect elements can include RF links, coaxial cables, waveguides, RF couplers, and threaded or bayonet connection elements, and the like. In many examples, which are detailed below, an RF transition feature is included between any RF link and RF input 130 to reduce or prevent reflections or unwanted induced modulations within housing 102 or at a terminal end of RF conduit 107. Example RF transmitter power levels include 300-600 W ranges, which is approximately 50% less power required than traditional resistive zeolite heaters.

In some examples, fluid reaction apparatus 101 may comprise one or more process controllers, control elements, or computing devices (not illustrated) configured to control and monitor the operation of fluid reaction apparatus 101. For example, the process controller or computing device may implement one or more control programs to control input and output fluid valves, adsorption/desorption cycles, temperature and reaction rate, monitor output fluid composition, and/or other types of control operations. The computing devices comprise one or more processors, software, memories, transceivers, bus circuitry, and the like. The processors may comprise central processing units (CPUs), Application-Specific Integrated Circuits (ASICs), Field Programmable Gate Arrays (FPGAs), and the like. The memories comprise Random Access Memory (RAM), flash circuitry, disk drives, and the like. The memories store software like operating systems, applications, control programs, and the like. The processors retrieve and execute the software from the memories to drive the operation of the computing devices. Further examples of such control elements or computing devices are found in FIG. 22.

Figure 4:
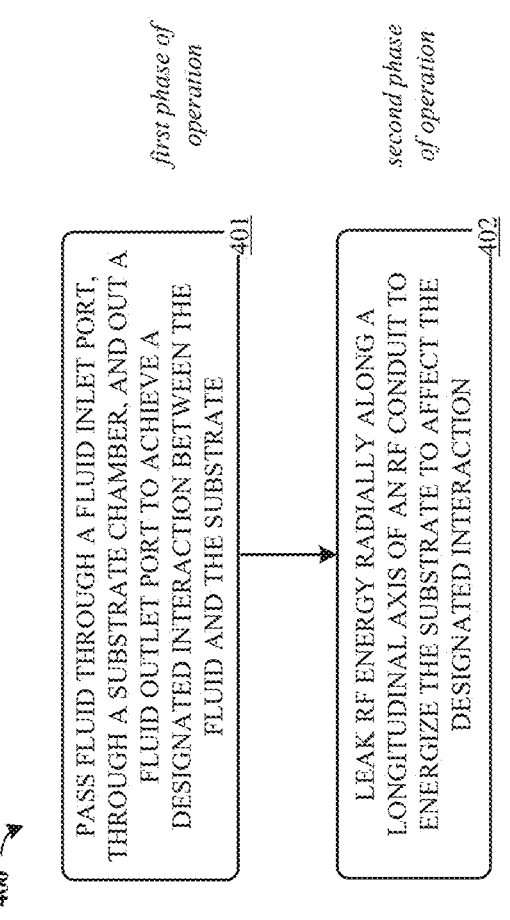
FIG. 4 illustrates an operation of a fluid reaction apparatus in an implementation.

In some examples, fluid reaction apparatus 101 may implement process 400 illustrated in FIG. 4. In some examples, fluid reaction apparatus 101 may implement process 500 illustrated in FIG. 5. In some examples, fluid reaction apparatus 101 may implement process 600 illustrated in FIG. 6.

Figure 3:
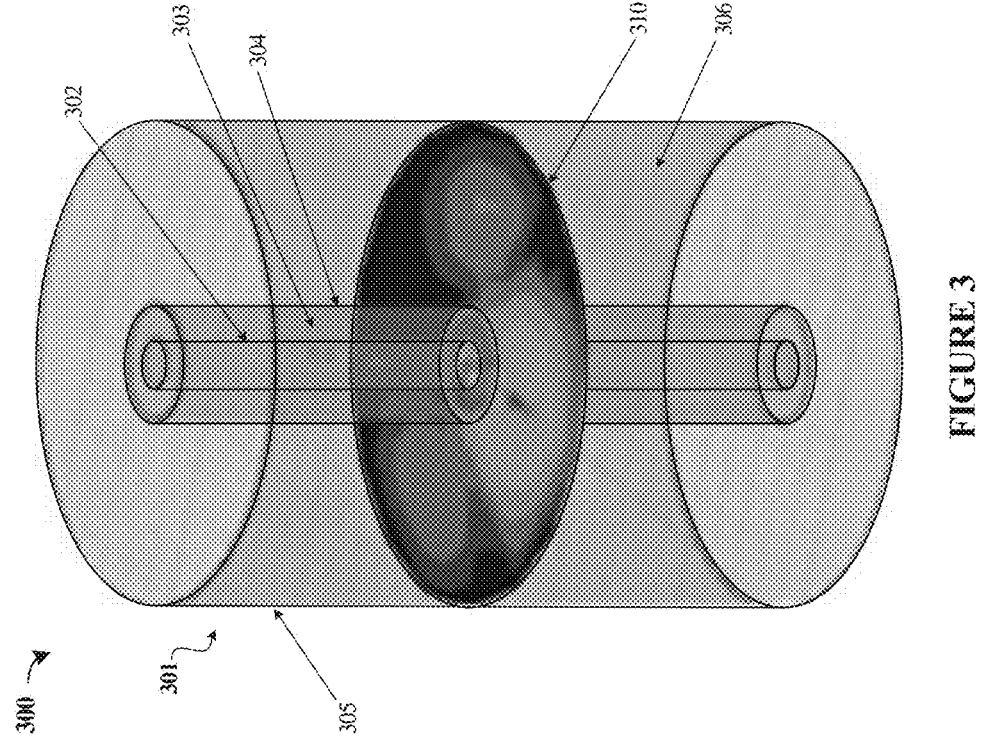
FIG. 3 illustrates a schematic view of a fluid reaction apparatus in an implementation.

FIG. 3 illustrates schematic view 300 of reaction apparatus 301. Reaction apparatus 301 is an example of apparatus 101 illustrated in FIGS. 1 and 2, however apparatus 301 may differ. View 300 illustrates the radial propagation of RF leakage through a substrate chamber. Reaction apparatus 301 comprises central conductor 302, leaky RF conduit 303, inner conductor 304, external conductor 305, annular region 306, and RF leakage 310.

Leaky RF conduit 303 houses central conductor 302 and is positioned along a longitudinal axis of apparatus 301. Central conductor 302 comprises a transmission line configured to carry RF energy down the longitudinal axis of apparatus 301. For example, central conductor 302 may comprise coaxial link. Leaky RF conduit 303 comprises a porous or hollow region between central conductor 302 and inner conductor 304 that allows a fluid to flow down conduit 303 and pass-through inner conductor 304 to enter annular region 306. Inner conductor 304 and outer conductor 305 comprise concentric cylinders that form annular region 306. A substrate like a molecular sieve or catalyst may be positioned within annular region 306 to achieve a designated interaction process with a fluid that enters annular region 306 from leaky RF conduit 303. Leaky RF conduit 303 comprises RF transparent pores (not illustrated) that leak RF leakage 310 radially into annular region 310.

Intensity of RF leakage 310 is illustrated as a single representative slice of the three-dimensional volume in FIG. 3. RF leakage 310 represents a distribution of RF energy leaked from a single RF window of leaky RF conduit 303 into annular region 306 that houses a substrate. Leaky RF conduit 303 is typically configured to leak RF energy into annular region 306 at multiple locations along the longitudinal axis of conduit 303. These multiple locations can coincide with many RF windows distributed along the longitudinal extent of leaky RF conduit 303.

FIG. 4 illustrates process 400. Process 400 comprises exemplary operations of a reaction apparatus to achieve desired interaction processes between a substrate and a fluid. In other examples, process 400 may differ. Process 400 includes passing a fluid through a fluid inlet port, through a substrate chamber, and out a fluid outlet port to achieve a designated interaction between the fluid and the substrate (operation 401). Process 400 further includes leaking RF energy radially along a longitudinal axis of an RF conduit to energize the substrate to affect a subsequent interaction (operation 402), such as a reverse interaction than that between the fluid and the substrate in operation 401. It should be understood that operations 401-402 might occur at different phases of operation of an apparatus, and fluid flow might be altered, reversed, or halted between operations 401-402.

Referring back to FIGS. 1 and 2, fluid reaction apparatus 101 includes a brief example of process 400 as employed by the various components that comprise apparatus 101. In a first phase of operation, fluid flow 120 enters housing 102 through inlet port 103. Fluid flow 120 passes through leaky RF conduit 107 and enters substrate chamber 105 via conduit pores 109 (with some exemplary flow arrows shown). Fluid flow 120 flows or permeates through and interacts with substrate 106 to achieve a desired interaction process (operation 401). Typically, the desired interaction process has a time limit or saturation limit, after which substrate 106 no longer supports significant interaction with fluid flow 120. In the air-$CO_2$ removal processes described herein, this saturation limit might include where substrate 106 no longer adsorbs $CO_2$ above a threshold rate. Fluid flow 120 can be stopped, reversed, or restricted at this saturation limit, and a second phase of operation can begin. In one example, namely during a desorption phase, inlet valve 113 and outlet valve 114 are closed with respect to fluid lines 116-117 and vacuum line 115 is opened to vacuum line 115. A vacuum or low pressure is then applied via vacuum line 115.

In the second phase of operation, center conductor 108 receives RF input 130. Leaky RF conduit 107 leaks RF leakage 131 radially into substrate chamber 105 along its longitudinal axis. RF leakage 131 energizes substrate 106 to affect a subsequent interaction process between substrate 106 and any component of fluid flow 120 which was previously adsorbed or absorbed by substrate 106. This subsequent interaction process might include release or outgassing of a component of fluid flow 120 from substrate 106 and back into a fluid flow being evacuated from fluid reaction apparatus 101. In the air-$CO_2$ removal processes described herein, this second phase can include expelling of $CO_2$ and moisture from the zeolite substrate which is then evacuated from one of the ports. The evacuated or desorbed components can be stored in various tanks, absorbed by desiccant materials, chemically reacted with other components in subsequent stages, or outgassed to the atmosphere or space.

It should be understood that the two-phase operation described above might include a different quantity of phases. For example, fluid flow 120 might be concurrent with application of RF energy into substrate 106 to affect an interaction between fluid flow 120 and substate 106. Conversely, a two-phase operation might instead be performed, where a first interaction process occurs between fluid flow 120 and substrate, followed by a second interaction process that reverses the interaction process while RF energy is applied to substrate 106. Further operational phases may be included which transition between fluid flow and application of RF energy, such as changing a configuration of fluid flow or valves, preparing for RF energy application, and beginning any associated interaction cycle anew. Typically, a cyclical or periodic repeating of the various phases of operation are performed.

Figure 5:
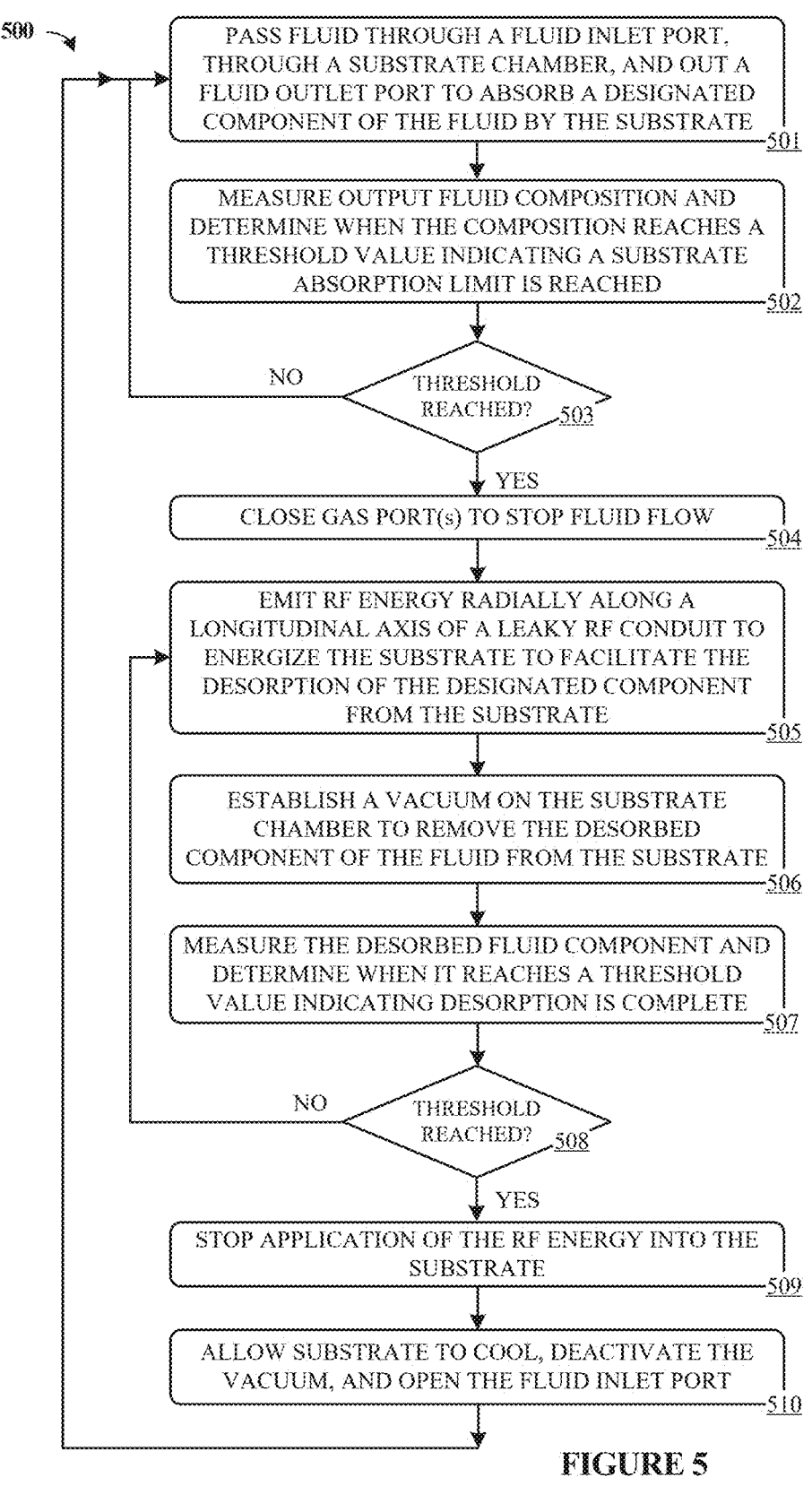
FIG. 5 illustrates an operation of a fluid reaction apparatus in an implementation.

FIG. 5 illustrates process 500. Process 500 comprises an exemplary operation of a reaction apparatus to achieve desired interactions between a substrate and a fluid. Process 500 can encompass operations illustrated in FIG. 4, although variations are possible. Process 500 includes passing a fluid through a fluid inlet port, through a substrate chamber to adsorb or absorb a designated component of the fluid to the substrate, and then passing the remainder fluid out a fluid outlet port (operation 501). Process 500 further includes measuring and monitoring the remainder output fluid composition and determining when properties of the composition reach a threshold value indicating a substate adsorption limit is reached (operations 502-503). If the threshold has not been reached, process 500 returns to operation 501. If the threshold has been reached, process 500 continues by closing an inlet port to stop inlet fluid flow (operation 504). Then, process 500 further includes emitting RF energy radially along a longitudinal axis of a leaky RF conduit to energize the substrate to facilitate the desorption of the designated component from the substrate (operation 505). Process 500 further includes establishing a vacuum on the substrate chamber to remove the desorbed component of the fluid from the substrate and chamber (operation 506). Process 500 further includes measuring and monitoring the desorbed fluid component properties, such as a flowrate or other properties, and determining when the properties reach a threshold value indicating desorption is complete (operations 507-508). If the threshold has not been reached, process 500 returns to operation 505. If the threshold has been reached, process 500 continues with stopping the emission of RF energy into the substate (operation 509). Process 500 includes deactivating the vacuum and opening the fluid inlet port (operation 510). Optionally, process 500 includes allowing the substrate to cool to a predetermined temperature. In some examples, process 500 operates recursively or cyclically and returns to operation 501 and repeats.

Referring back to FIGS. 1 and 2, fluid reaction apparatus 101 includes a brief example of process 500 as employed by the various components that comprise apparatus 101. In this example, fluid reaction apparatus 101 comprises a gas adsorption/desorption apparatus, substrate 106 comprises a molecular sieve (e.g., zeolite), fluid flow 120 comprises air, and the designated interaction comprises a carbon dioxide ($CO_2$) separation process.

In operation, fluid inlet valve 113 and outlet valve 114 are opened with respect to fluid lines 116-117, and fluid flow 120 enters housing 102 through inlet port 103. Fluid flow 120 may be pressurized by a fan, pump, compressor, or some other type of device to drive the movement of fluid flow 120 through housing 102. Fluid flow 120 travels down leaky RF conduit 107 and enters substrate chamber 105 through conduit pores 109 distributed along the length of conduit 107. Fluid flow 120 contacts substrate 106 and $CO_2$ of flow 120 adsorbs to substrate 106 to separate at least a portion of the $CO_2$ from flow 120 (operation 501). The molecular sieves of substate 106 comprise pores with a diameter that allows $CO_2$ to enter the sieve and that excludes molecules larger than the pore diameter from entering the sieve. The molecular sieves of substate 106 also comprise chemical properties to bind the $CO_2$ to the pores and that inhibit binding of other molecules. For example, in the case where substrate 106 comprises a zeolite, the zeolite may comprise sodium ions that form chemical bonds with $CO_2$ to adsorb the $CO_2$ that inhibit bonding with other gases like molecular oxygen ($O_2$) and molecular nitrogen ($N_2$). In some examples, the molecular sieves of substrate 106 adsorb the designated component of fluid flow 120 using physical adsorption. The physical adsorption may comprise inter-molecular forces, such as van der Waals interactions, between the designated component and the sieves. It should be appreciated that the adsorption mechanism employed by substrate 106 is not limited to the inter-molecular force examples herein. The adsorption mechanism may comprise a chemical adsorption process like bond formation and/or a physical adsorption process like van der Waals interactions or other inter-molecular force interactions/processes.

Fluid flow 120 exits substrate chamber 105 through chamber pores 110 and passes out of housing 102 through fluid outlet port 104. A process controller operatively coupled to outlet port 104 measures the composition of flow 120 to monitor the level of carbon dioxide in fluid flow 120 and determines when the outlet level of carbon dioxide reaches a threshold level (operations 502-503). The process controller may utilize a gas analyzer to measure outlet gas composition. As substrate 106 adsorbs carbon dioxide, the molecular sieves of substate 106 eventually reach saturation and the adsorption capacity of substrate 106 decreases in a process referred to as breakthrough. The process controller correlates the level of outlet carbon dioxide to a saturation level of substrate 106 to determine when a threshold level of saturation (e.g., breakthrough) is reached.

If the threshold level has not been reached, fluid flow 120 continues to be passed through housing 102 to separate carbon dioxide. When process controller determines a saturation threshold is reached, the process controller transfers control signaling to close gas inlet valve 113 and outlet valve 114 with respect to fluid lines 116-117 and to open vacuum line 115 (operation 504) and transfers additional control signaling to initiate transfer of RF input 130 down center conductor 108 (operation 505). For example, the control signaling may drive actuators in inlet valve 113 and outlet valve 114 to actuate as noted above and drive an RF transmitter to turn on. The RF transmitter might operate in a range of 300-600 W to generate RF input 130. RF input 130 can comprise RF energy at approximately a 1 GHZ frequency. However, in other examples, RF input 130 may comprise RF energy in a range of 900 MHz-5 GHz. The operating frequency of RF input 130 depends in part on the designated interaction between substrate 106 and fluid flow 120 and the size of substrate chamber 105. RF input 130 enters substrate chamber 105 as RF leakage 131 via RF transparent dielectric windows. RF input 130 leaks along the longitudinal axis of conduit 107 and propagates radially into substrate chamber 105 to uniformly heat substrate 106. The radial propagation results in an even temperature distribution in substrate 106. RF leakage 131 is absorbed by and energizes substrate 106 to facilitate the desorption of the carbon dioxide from the molecular sieves (operation 505). For example, RF leakage 131 may excite chemical or inter-molecular bonds between the molecular sieves of substrate 106 and the carbon dioxide to cause bond breakage and desorption of the carbon dioxide.

The process controller transfers control signaling to a pump to establish a vacuum or low-pressure configuration on housing 102 via vacuum line 115 to remove the desorbed carbon dioxide from substrate chamber 105 through outlet port 104 (operation 506). For example, the control signaling may drive actuators in outlet port 104 to connect housing 102 to the vacuum pump. The process controller measures the outlet flowrate of the desorbed gas and determines when the outlet flowrate reaches a reaches a threshold value indicating desorption is complete (operations 507-508). For example, a flowmeter in outlet port 104 may measure and report desorption flowrate to the process controller. The process controller may correlate the flowrate to a desorption level in substrate 106 to determine when desorption is complete. Typically, the threshold is reached when the outlet desorption flowrate decreases below a threshold value. If the threshold has not been reached, process controller maintains the vacuum and the RF transmitter continues to send RF input 131 down center conductor 108. Alternatively, the process controller may determine desorbed gas removal is complete based on a predetermined timer. For example, a process controller may determine desorbed gas removal is complete when the vacuum has operated for an operator-configurable time, such as one hour.

When the threshold has been reached, the process controller transfers control signaling to deactivate the RF transmitter, deactivate the vacuum pump, and to open inlet valve 113 and outlet valve 114 with respect to fluid lines 116-117 (operations 509-510). Due to the three-way value configuration of outlet valve 114, opening outlet valve 114 with respect to fluid line 117 also closes vacuum line 115. Substrate 106 might be allowed to cool in temperature to a set temperature value before the process continues. To continue the process in a cyclical manner, the process controller reactivates fluid flow 120. For example, the process controller transfers control signaling to activate a fan to drive the movement of fluid flow 120 into housing 102. Process 500 then repeats as described above.

FIG. 6 illustrates process 600. Process 600 comprises an exemplary operation of a reaction apparatus to achieve a desired interaction process between a substrate and a fluid. Process 600 can be an example of process 400 illustrated in FIG. 4, however process 400 may differ. Process 600 includes passing a fluid through a fluid inlet port, through a substrate chamber to catalyze a designated reaction in the fluid by the substrate, and out a fluid outlet port (operation

601). Process 600 further includes emitting RF energy radially along a longitudinal axis of a leaky RF conduit to energize the substrate and the fluid to initiate the designated chemical reaction in the fluid (operation 602). Process 600 further includes measuring output fluid composition and determining when a desired rate of reaction is achieved (operation 603).

Referring back to FIGS. 1 and 2, fluid reaction apparatus 101 includes a brief example of process 600 as employed by the various components that comprise apparatus 101. In this example, fluid reaction apparatus 101 comprises a reaction catalyst apparatus, substrate 106 comprises a catalyst like iron, fluid flow 120 comprises a liquid reactant mixture, and the designated interaction comprises a reaction catalysis process. For example, substrate 106 may catalyze a toluene cracking reaction. However, it should be appreciated that the type of chemical reaction and the catalysis mechanism are not limited by this example.

In operation, a process controller transfers control signaling to open fluid inlet valve 113 and outlet valve 114 with respect to fluid lines 116-117 and activates a pump to drive fluid flow 120 through inlet port 103 into housing 102. Fluid flow 120 travels down leaky RF conduit 107 and enters substrate chamber 105 through pores 109 in leaky RF conduit 107. Fluid flow 120 contacts substrate 106 (operation 601). The chemical interaction between fluid flow 120 and the catalyst of substrate 106 lowers the required activation energy to achieve the designated chemical reaction in fluid 120. The process controller transfers control signaling to activate an RF transmitter to send RF input 130 down center conductor 108. RF input 130 enters substrate chamber 105 as RF leakage 131 via RF transparent dielectric windows. RF input 130 leaks along the longitudinal axis of conduit 107 and radially into substrate chamber and external to RF conduit 107 to uniformly heat substrate 106 and fluid 120. RF leakage 131 propagates radially throughout chamber 105 to achieve an even temperature distribution in substrate 106 and fluid flow 120. RF leakage 131 is absorbed by and energizes substrate 106 and fluid 120 to provide the activation energy to initiate the chemical reaction in fluid 120 (operation 602). For example, RF leakage 131 may excite molecules in fluid 120 to possess to an average energy level higher than the activation energy requirements of the reaction.

The reactants of fluid flow 120 react in response to the energy provided by RF leakage 131 and the catalytic action provided by the catalyst of substrate 106 to form a reaction product. Fluid flow 120 passes out of substrate chamber 105 via chamber pores 110 and exits housing 102 via outlet port 104. The process controller measures the composition of fluid flow 120 at the outlet and measures the temperature of substrate chamber 105 (operation 603). The process controller determines a rate of reaction for fluid flow 120 based on the measured composition of fluid flow 120 and the measured temperature of substrate chamber 106. For example, the process controller may input the proportion of reaction product, proportion of reactants, and temperature to a reaction kinetics model for the designated reaction to determine the rate of reaction (operation 603). The process controller may toggle the RF transmitter on and off to raise or lower the temperature of substrate chamber 105. By controlling the temperature of substrate chamber 105, the process controller can manipulate the rate of reaction until a desired rate of reaction is achieved.

Turning now to FIGS. 7-21, a series of illustrations of an example implementation of a reaction apparatus are shown. The reaction apparatus in FIGS. 7-21 can be an example of any of the reaction apparatuses and associated elements discussed above, such as those in FIGS. 1-6. However, FIGS. 7-21 are not limited to the discussion of FIGS. 1-6.

Figure 7:
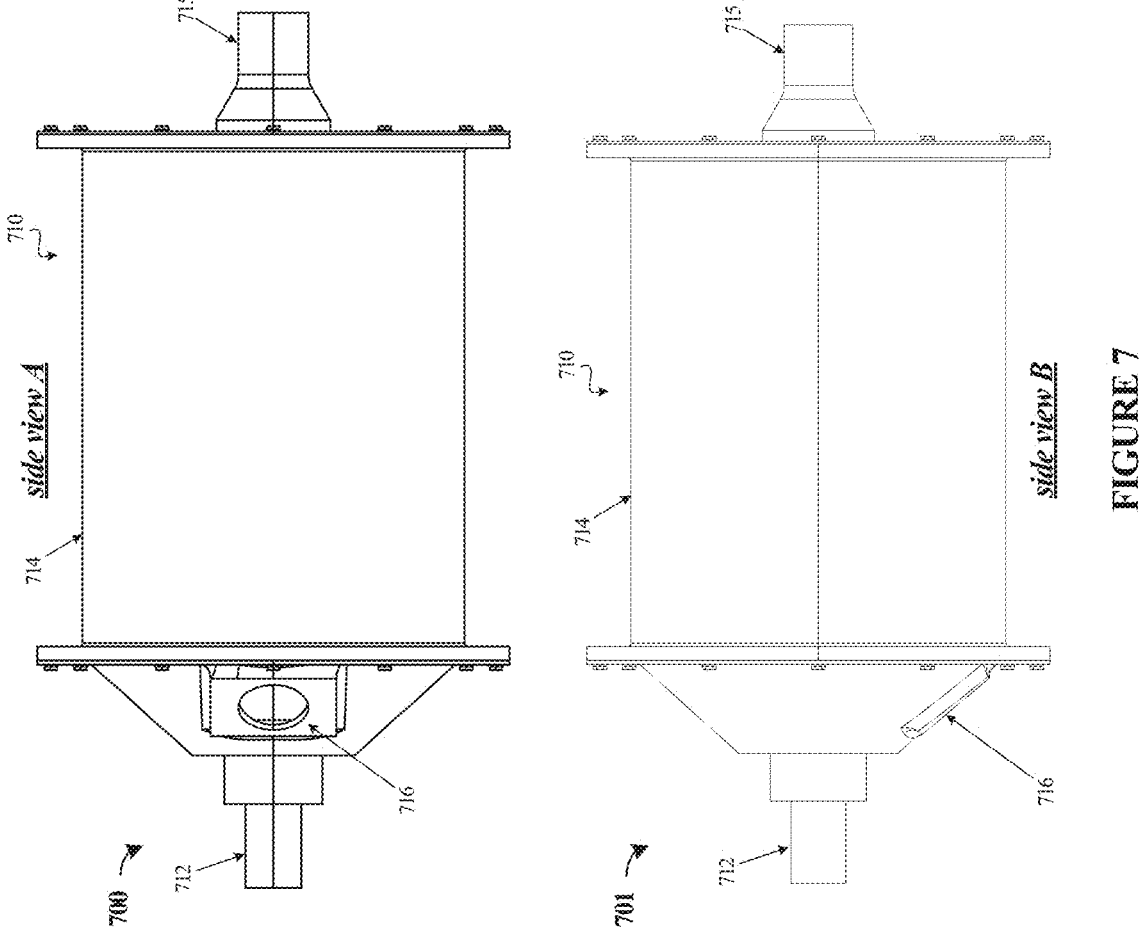
FIG. 7 illustrates views of a fluid reaction apparatus in an implementation.

FIG. 7 includes views 700 and 701 that depict reaction apparatus 710. View 700 is a side view 'A' of reaction apparatus 710 and view 701 is another side view 'B' of reaction apparatus 710 with a different axial rotation. Reaction apparatus 710 is an example of reaction apparatus 101 illustrated in FIGS. 1-2, however apparatus 101 may differ. Reaction apparatus 710 may be configured to implement an adsorption/desorption process, a reaction catalysis process, or some other type of interaction process between a fluid and a substrate.

Reaction apparatus 710 comprises leaky RF conduit 712, apparatus body 714, gas inlet port 715, and gas outlet port 716. Apparatus body 714 comprises a cylindrical drum housing that is capped on both longitudinal ends. As illustrated in FIG. 7, the end caps are bolted or otherwise fastened to the cylindrical drum, although single workpiece arrangements are possible. Various fluid-sealing gaskets, or O-rings can be included on the end caps, which may include electrical or conductive gaskets as well. The cylindrical drum and end caps form an enclosed region to house and provide structural support to the other components of reaction apparatus 710. Apparatus body 714 may be constructed from aluminum, steel, polymers, reinforced composites, and insulating materials, among other various materials. Apparatus body 714 is generally impermeable to fluid except at designated fluid entry and exit points. Apparatus body 714 can also include thermal blankets or insulation to thermally isolate apparatus body 714 from external systems and reduce a rate of heat transfer to and from apparatus body 714. Moreover, apparatus body 714 can electrically shield internal components of apparatus body 714 from external systems to reduce emissions or susceptibility of Reaction apparatus 710 to/from external systems.

Leaky RF conduit 712 enters apparatus body 714 on a side through a 'front' endcap. Leaky RF conduit 712 comprises a coaxial configuration in some examples that houses a central conductor (hidden from view) to carry RF energy into apparatus body 714. Leaky RF conduit 712 may comprise a leaky coaxial cable, leaky waveguide, or other suitable RF transmission medium. Leaky RF conduit 712 comprises one or more connectors to couple to an RF source. For example, leaky RF conduit 712 may connect to a coaxial cable to couple conduit 712 to an RF transmitter. The connectors can comprise various threaded, bayonet, or press-fit connections, which may include hermetic sealing features or various gas/fluid sealing gaskets or adhesives.

Fluid inlet port 715 is positioned on the endcap of apparatus body 714 opposite the entry point of leaky RF conduit 712. Fluid inlet port 715 provides a point of entry for a fluid to enter apparatus body 714. Fluid outlet port 716 is positioned on the front endcap opposite of apparatus body 714 opposite the endcap where inlet port 715 is positioned. Fluid outlet port 716 comprises a point of exit for a fluid to leave apparatus body 714. Ports 715 and 716 may comprise hoses, fluid conduits, filters, valves, flowmeters, analyzers, and/or other types of equipment to regulate the flow of fluid through reaction apparatus 710. Ports 715 and 716 can include RF filtering elements, such as shields, reflectors, screens, perforated discs, chokes, coils, ferrite elements, or other elements to reduce RF emissions or susceptibility at ports 715 and 716.

FIG. 8 includes end views 800 and 801 that depict reaction apparatus 710. View 800 is a front-end view of reaction apparatus 710 and view 801 is a rear end view of reaction apparatus 710. View 800 highlights leaky RF conduit 712, apparatus body 714, outlet port 716, and central conductor 730. View 801 highlights apparatus body 714 and fluid inlet 705. Central conductor 730 is housed by leaky conduit 712 and runs along the central longitudinal axis of apparatus body 714. Central conductor 730 may comprise a solid conductor, stranded conductor, or plated conductors, and the like configured to transfer RF energy. Various conductive materials can be employed for central conductor 730, such as copper, aluminum, gold, silver, platinum, palladium, nickel, or other various materials, including alloys, mixtures, platings, and various combinations thereof.

Figure 9:
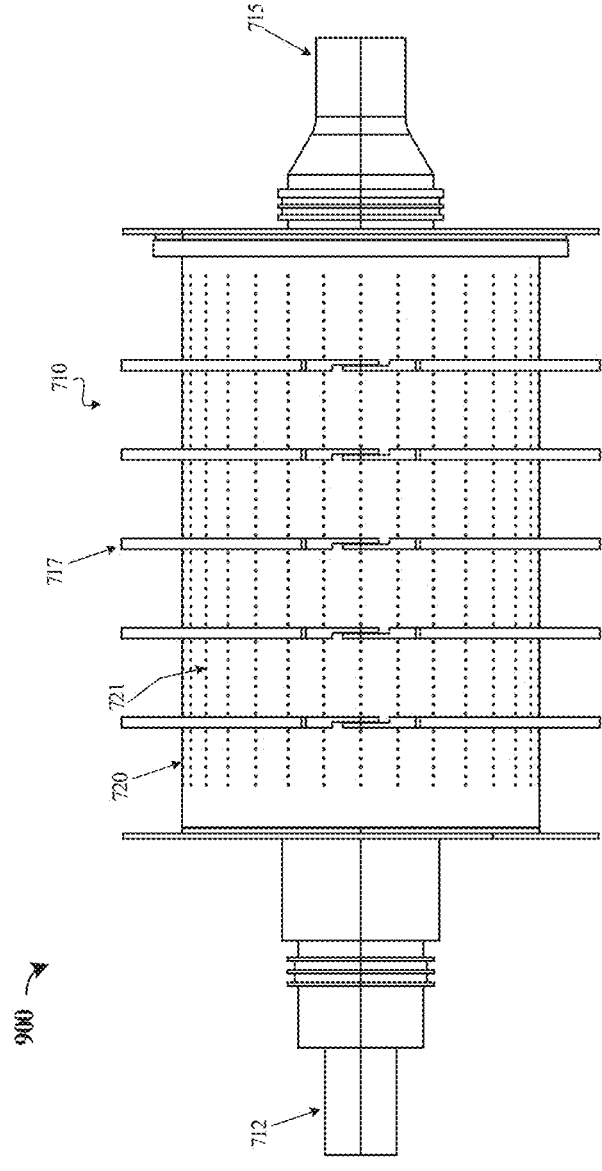
FIG. 9 illustrates a view of a fluid reaction apparatus in an implementation.

FIG. 9 includes view 900. View 900 comprises an internal view of reaction apparatus 710. Reaction apparatus 710 further comprises support ribs 717 and substrate chamber 720. Support ribs 717 comprise structural elements to provide support for and maintain the shape of the shell of apparatus body 714. Support ribs 717 are circular and evenly spaced along length of apparatus body 714. Support ribs 717 may be constructed from steel, aluminum, polymer, reinforced composite, or some other type of structural material.

Substrate chamber 720 comprises a perforated cylinder having pores 721 in corresponding walls. Substrate chamber 720 surrounds and carries a substrate material within apparatus body 714. In some examples, the diameter of substrate chamber 720 is 10 inches with a length of 15 inches, although these geometries will vary based on implementation, packaging constraints, environmental requirements, RF frequencies, reaction constituents, and other factors. Also within substrate chamber 720 resides a leaky RF conductor arrangement (hidden from view). Substrate chamber 720 in combination with the leaky RF conductor thus forms annular region to house or carry a substrate. Substrate chamber 720 might be considered an 'outer' conductor or electrical shield with respect to the substrate, forming an annular region between an outer/shield conductor of the leaky RF conductor arrangement and the walls of substrate chamber 720.

The perforations (pores 721) in substrate chamber 720 are sized to be generally impermeable to the enclosed substrate and permeable to the fluid. For example, the substrate may comprise a zeolite. Example zeolite configurations comprise beads, extruded cylindrical shapes, or other forms of particulate matter. One example zeolite configuration includes individual particles around 1.5 millimeter (mm) to 2.5 mm in diameter. In this case, the perforations or pores in substrate chamber 720 comprise a diameter less than 1.5 mm but large enough as to not substantially inhibit fluid flow out of chamber 720, such as 1.27 mm (0.50 inch) with a 60-degree staggered hole pattern.

Substrate chamber 720 will include a substrate material, and this substrate material is selected for having properties to achieve the designated interaction process with a fluid flow. The substrate material may comprise a molecular sieve, a chemical reactant, a catalyst, or some other type of material to achieve the designated interaction process. Exemplary substrate materials include molecular sieves like zeolites, ceramic clays, silica gel, activated carbon, porous glass, and catalysts like iron (Fe), nickel (Ni), molybdenum Zeolite Socony Mobil-5 (Mo/ZSM-5), copper iron oxide ($CuFe_2O_4$), copper (Cu), nickel disulfide ($NiS_2$), cobalt (Co), protonic ZSM-5 (HZSM-5), and/or other types of sieves and catalysts. For example, for $CO_2$ removal, the substrate material may comprise zeolite 13X, the fluid flow may comprise breathing air, and the designated interaction process may comprise the adsorption/desorption of carbon dioxide ($CO_2$) onto the zeolite to separate the carbon dioxide from the breathing air. Other interactions might be performed based on the substrate materials selected, fluids employed, and geometries of the reaction apparatus. In addition to the substrate, a filler material can be disposed in the annular space between substrate chamber 720 and apparatus body 714, such as borosilicate glass filter material, among other suitable materials. This filler material can aid in retention of the substrate within substrate chamber 720.

Figure 10:
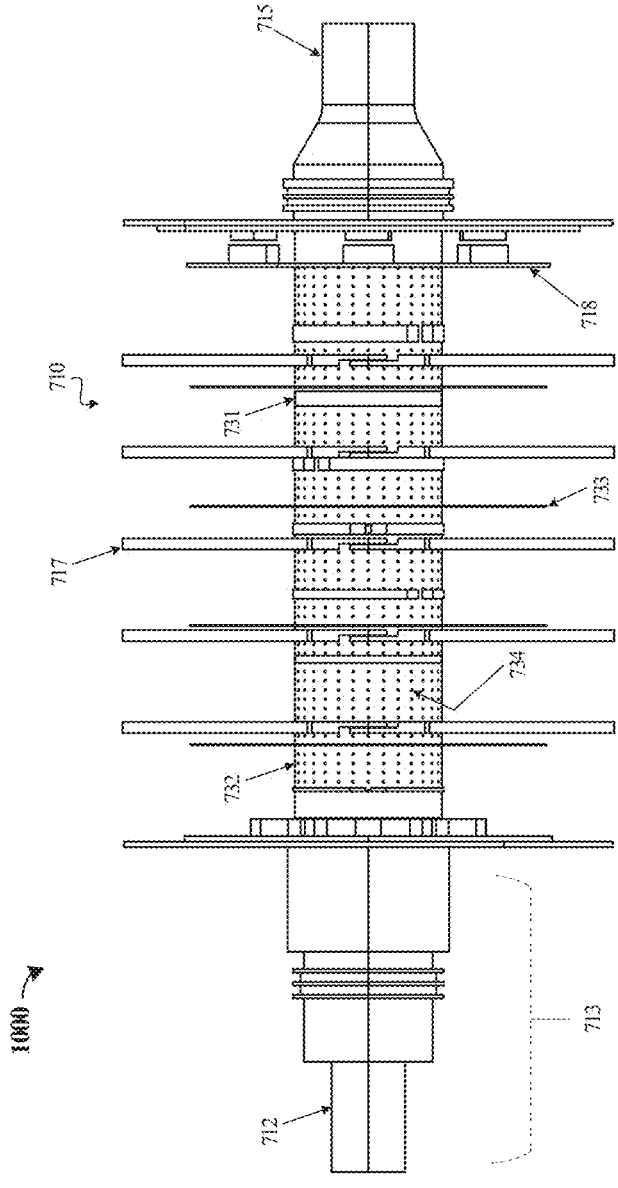
FIG. 10 illustrates a view of a fluid reaction apparatus in an implementation.

FIG. 10 includes view 1000. View 1000 comprises an internal view of reaction apparatus 710. Reaction apparatus 710 further comprises plate or pusher 718, outer conductor 732 of RF conduit 712, and RF windows 731 formed in outer conductor 732 of RF conduit 712. Optional RF channelers 733, also referred to as RF R-cards, can be included. Pusher 718 is positioned on the rear endcap of apparatus body 714, although other configurations are possible. Pusher 718 comprises an annular or donut shaped disk that encircles outer conductor 732. Pusher 718 can comprise various elements which exert a pressure onto pusher 718, such as a set of springs and set screws, stacked disc springs (e.g., Belleville washers), pneumatic pressure elements, hydraulic pressure elements, electromagnetic solenoids, screw drives, and other similar elements. When set screws are employed, these are adjusted to create a target tension in the springs to provide force onto pusher 718. Pusher 718 then compresses a substrate (not shown) housed in the annular region between substrate chamber 720 and outer conductor 732. By compressing the substrate, fluid movement through the annular region is optimized to ensure the fluid and the substrate perform the designated interaction process (e.g., gas adsorption) before the fluid exits the annular region through substrate chamber 720 by preventing fluid channeling within or settling of the substrate. The compression additionally maintains the shape of the substrate as the temperature of the substrate changes and prevents movement of the substrate which can result in abrasion and substrate particle degradation into smaller particles or dust.

Outer conductor 732, also referred to as a shield conductor, forms the external portion of coaxial leaky RF conduit 712 and comprises a perforated cylinder that forms the inner wall of the annular region. Like substrate chamber 720, the perforations (pores 734) of outer conductor 732 are sized to allow fluid to enter the annular region and prevent the substrate from escaping the annular region. Fluid may enter apparatus body 714 via inlet port 715 and flow within the volume or cavity defined by outer conductor 732. The fluid then exits outer conductor 732 via pores 734 and enters the annular region between outer conductor 732 and substrate chamber 720 through the perforations in outer conductor 732. The fluid flows through the substrate in the annular region and undergoes a designated process interaction with the substrate. The fluid exits the annular region via the perorations (pores 721) in substrate chamber 720 and exits apparatus body 714 through outlet port 716.

RF channelers 733 may comprise conductive sheets configured to channel, disperse, diffuse, or reflect RF energy that leaks into the annular region via RF windows 731 into discrete compartments. Since some substrates are poor RF absorbers, RF channelers 733 can be used to reflect unabsorbed RF energy back into the substrate to increase the likelihood that the substrate absorbs the RF energy. RF channelers 733 may be interspersed between the substrate to create radial chambers in the annular region. RF channelers 733 might not be conductively attached to outer conductor 732 or substrate chamber 720 and can be held in place by compression of the surrounding substrate by pusher 718. In some examples, RF channelers 733 are absent from reaction apparatus 710 due to the substrate and set of interactions selected. In particular, RF channelers 733 may create sneak paths or fluid channels along their surfaces that allows fluid to flow through the annular region without sufficiently interacting with the substrate. In such cases, RF channelers 733 may be removed. When included, RF channelers 733 can comprise various conductive films and materials, such as aluminum films, mylar films, conductively coated polymers, or other materials. Pores can be included in RF channelers 733 to facilitate diffusion of fluid between chambers.

RF windows 731 comprise fluid-tight apertures in outer conductor 732 filled with an RF-transparent or dielectric material that allow RF energy to radially exit leaky RF conduit 712 once carried into apparatus body 714, making the RF conduit 'leaky' with regards to RF energy. RF windows 731 also prevent the working fluid from entering or exiting leaky RF conduit 712 therefrom, instead ensuring the fluid transits through pores 734. RF windows 731 may be formed from structural supports or spacer elements for spacing of central conductor 730 with respect to outer conductor 732 of leaky RF conduit 712 and are coupled between central conductor 730 and outer conductor 732. Regardless of the physical configuration, RF windows 731 are configured to leak RF energy carried by leaky RF conduit 712 into the annular region housing the substrate while preventing ingress/egress of the fluid.

The RF leakage propagates radially throughout the annular region to affect the designated interaction (e.g., molecular desorption) between the fluid and the substrate. The frequency of the RF energy transmitted via leaky RF conduit 712 is tuned so that the radial decay of the RF leakage propagates sufficiently throughout the annular region. Typically, as the frequency of the RF energy decreases, the radius of the annular region increases to account for the change in decay. The RF energy supplied along leaky RF conduit 712, subsequently leaked into the annular region, and absorbed by the substrate housed in the annular region form a matching network to inhibit RF reflection back towards the RF source, aided by several stepped features 713 in central conductor 730 of leaky RF conduit 712. Stepped features 713 comprise step-ups in diameter for center conductor 730 and outer conductor 732 to provide impedance matching for the RF system comprising leaky RF conduit 712, the annular region, the substrate, and the walls of substrate chamber 720 to reduce or prevent reflections of the RF energy back along central conductor 730 to the RF source. Stepped features 713 can be supported within the surrounding cavity with high-temperature non-conductive or dielectric supports which are perforated to provide airflow.

Figure 11:
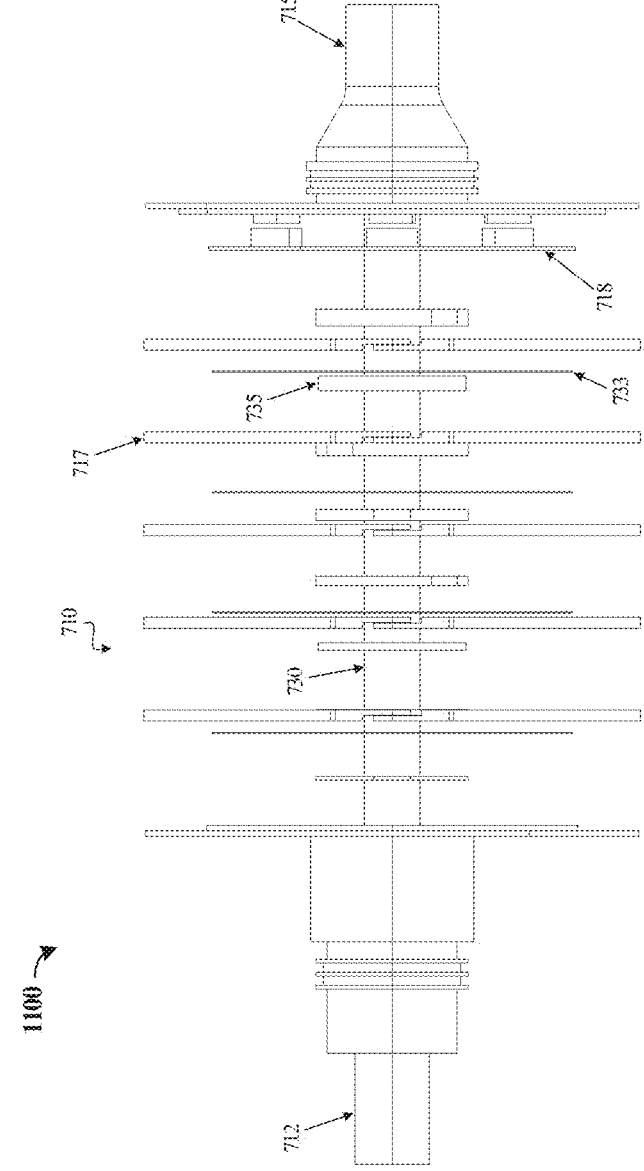
FIG. 11 illustrates a view of a fluid reaction apparatus in an implementation.

FIG. 11 includes view 1100. View 1100 comprises an internal view of reaction apparatus 710. Reaction apparatus 710 further comprises central conductor 730 and spacer elements 735 for leaky RF conduit 712. Central conductor 730 runs along the longitudinal axis of reaction apparatus 710. Central conductor 730 enters reaction apparatus 710 at a front longitudinal end and terminates at a rear longitudinal end. Central conductor 730 carries the RF energy into apparatus body 714 and leaks RF energy into the annular region via RF windows 731.

Figure 12:
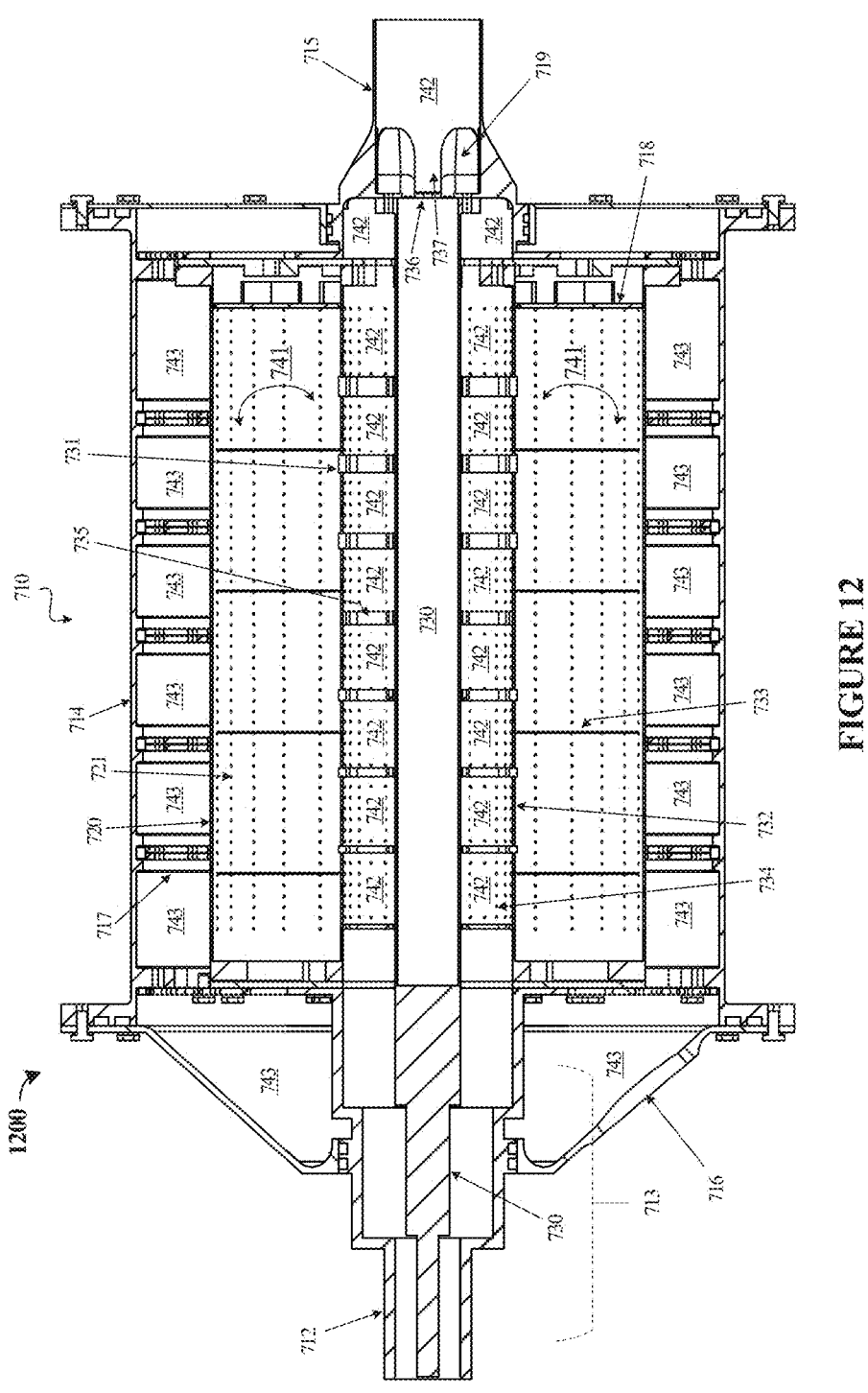
FIG. 12 illustrates a view of a fluid reaction apparatus in an implementation.
Figure 13:
FIG. 13 illustrates views of a fluid reaction apparatus in an implementation.

FIG. 12 includes cross-sectional view 1200 that highlights internal features of reaction apparatus 710. In view 1200, reaction apparatus 710 comprises leaky RF conduit 712, apparatus body 714, inlet port 715, outlet port 716, support ribs 717, pusher 718, fluid manifolds 719, substrate chamber 720, chamber pores 721, central conductor 730, RF windows 731, outer conductor 732, RF channelers 733, conduit pores 734, RF short 736, spacer elements 735, annular space 741, fluid path 742, and fluid path 743. Reaction apparatus 710 further comprises a substrate (e.g., a molecular sieve or catalyst) housed in annular region 741 however the substrate is not illustrated for the sake of clarity. In the following operational example, the substrate comprises zeolite, the fluid comprises air, and the designated interaction process comprises a carbon dioxide separation process. In other examples, the structure an operation of reaction apparatus 710 may differ.

In operation, pressurized air is pumped into apparatus body 714 through fluid inlet port 715. The air passes through fluid manifold 719 and fluid path 742 within leaky RF conduit 712. Fluid manifold 719 reduces pressure drop in the air as air enters leaky RF conduit 712 along fluid path 742. The air exits RF conduit 712 through conduit pores 734 in outer conductor 732 to enter annular region 741. The constituent air components like oxygen, nitrogen, water, and carbon dioxide enter the pores in the zeolite and interface or interact with the zeolite. The zeolite pores may comprise sodium ions which effectively bond to carbon dioxide and water but ineffectively bond the other constituent air molecules like oxygen and nitrogen. The carbon dioxide (and water molecules) adsorb to the zeolite, thus separating the carbon dioxide from the air. The reminder fluid, essentially air with a lesser partial pressure of carbon dioxide and lesser moisture content, passes out of annular region 741 through chamber pores 721 on the surface of substrate chamber 720 and then travels through fluid path 743 exiting apparatus body 714 via outlet port 716.

The concentration of carbon dioxide in the outlet gas stream is monitored, typically reflecting a decrease in carbon dioxide concentration from the reaction or interaction of air with the substrate. However, at some point after the decrease in concentration of carbon dioxide, the outlet gas is measured to identify an increase in outlet carbon dioxide concentration-indicating breakthrough has occurred. At breakthrough, the zeolite has become saturated to the point where it can no longer effectively adsorb any additional carbon dioxide. A valve preceding inlet fluid port valve 715 and a valve after fluid outlet port 716 are closed and air stops flowing into apparatus body 714. An RF source is triggered to transfer RF energy into apparatus body 714 via central conductor 730. The RF energy leaks into annular region 741 via RF windows 731. The RF leakage propagates radially throughout annular region 741 and is absorbed into the zeolite. RF channelers 733, substrate chamber 720, and outer conductor 732 reflect unabsorbed RF leakage back to the zeolite to increase energy absorption. The absorbed RF energy disrupts the intermolecular bonds or chemical bonds between the zeolite sodium ions and the carbon dioxide, as well as the intermolecular bonds or chemical bonds between the zeolite sodium ions and the water. The disruption causes the bonds to degrade or break resulting in desorption of the carbon dioxide and the water from the zeolite.

A vacuum valve is opened, and a vacuum is established on apparatus body 714 via fluid outlet port 716 and/or inlet port 715. The pressure differential induced by the vacuum causes the desorbed carbon dioxide and water to flow out of annular region 741 via chamber pores 721 in substrate chamber 720. The desorbed gas travels through fluid path 743 and exits apparatus body 714 via outlet port 716 and/or inlet port 715. The desorbed gas flowrate is measured to determine when the desorbed gas has been sufficiently removed from the zeolite. When the flowrate drops to a level indicating sufficient gas removal, the vacuum valve is closed, the vacuum is deactivated, and the RF transmitter is commanded to stop transmitting RF energy along central conductor 730. The zeolite is then optionally allowed to cool and the valves preceding inlet fluid port 715 and after fluid outlet port 716 are opened. Air flows through inlet port 715 and the carbon dioxide separation process is repeated. Alternatively, instead of measuring desorbed outlet gas flowrate, the vacuum may be applied for a set time period. For example, it may be empirically determined that sufficient desorbed gas removal takes no longer than one hour. In this example, when the vacuum is pulled, a one-hour timer is set and upon expiration, the vacuum is deactivated.

As seen in several of the Figures, the widths of RF windows 731 can be configured to increase in width over the longitudinal extent of leaky RF conduit 712. Although not required, this increasing width arrangement of RF windows 731 can affect impedance matching of leaky RF conduit 712, ensure that leaky RF conduit 712 is more 'leaky' closer to a terminal end of leaky RF conduit 712 than that of the input end of leaky RF conduit 712, and provide for more even distribution of RF energy within the substrate. In some examples, RF energy leaks through these slots formed from RF windows 731 which are carefully positioned along outer conductor 732 to provide even heating of zeolite during desorption phases. A properly tuned arrangement can be configured to absorb >90% of the incident RF energy into the substrate.

The interface between leaky RF conduit 712 and air inlet port 715 includes RF short 736 at a longitudinal end of central conductor 730. RF short 736 comprises an electrically conductive connection that inhibits RF energy carried by central conductor 730 from leaking through inlet port 715 and exiting apparatus body 714. RF short 736 may comprise electrically bonded or bolted joints between central conductor 730 and a portion of apparatus body 714 that provide electrical continuity through a low-resistance path to apparatus body 714. In this example, RF short 736 can couple to a gusset or other projection forming stub 737 of air inlet port 715.

FIG. 13-21 are now presented as illustrating various end views and isometric end views of reaction apparatus 710. First, FIG. 13 includes views 1300 and 1301 that depict reaction apparatus 710. View 1300 is a front view of reaction apparatus 710 and view 1301 is a rear view of reaction apparatus 710. In these views, reaction apparatus 710 comprises leaky RF conduit 712 having central conductor 730, apparatus body 714, gas inlet port 715, and gas outlet port 716.

Figure 14:
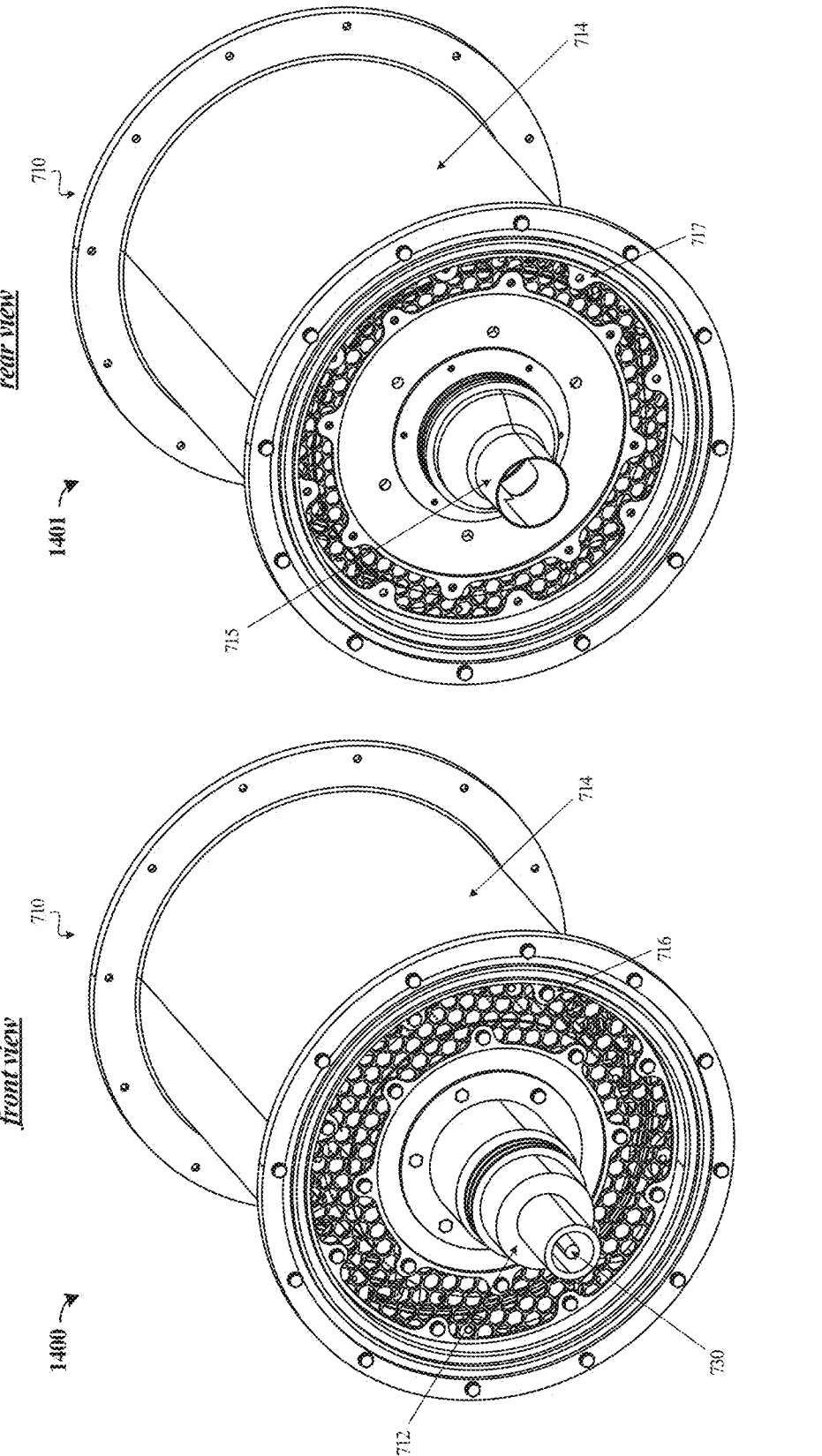
FIG. 14 illustrates views of a fluid reaction apparatus in an implementation.

FIG. 14 includes views 1400 and 1401 that depict reaction apparatus 710. View 1400 is an alternate front view of reaction apparatus 710 and view 1401 is an alternate rear view of reaction apparatus 710 than those depicted in FIG. 8. In these views, the front and rear endcaps of apparatus body 714 are removed revealing support ribs 717. As stated above, support ribs 717 comprise cylindrical disks that encircle substrate chamber 720 and provide internal structural support to apparatus body 714 and the various other components that comprise reaction apparatus 710. Support ribs 717 comprise open sections that allow fluid to flow freely through path 743 and exit apparatus body 714 via fluid outlet port 716. Circular or hexagonal holes might perforate support ribs 717 to provide for fluid penetration, reduce mass, and reduce parasitic heat transfer from the heated substrate to apparatus body 714.

Figure 15:
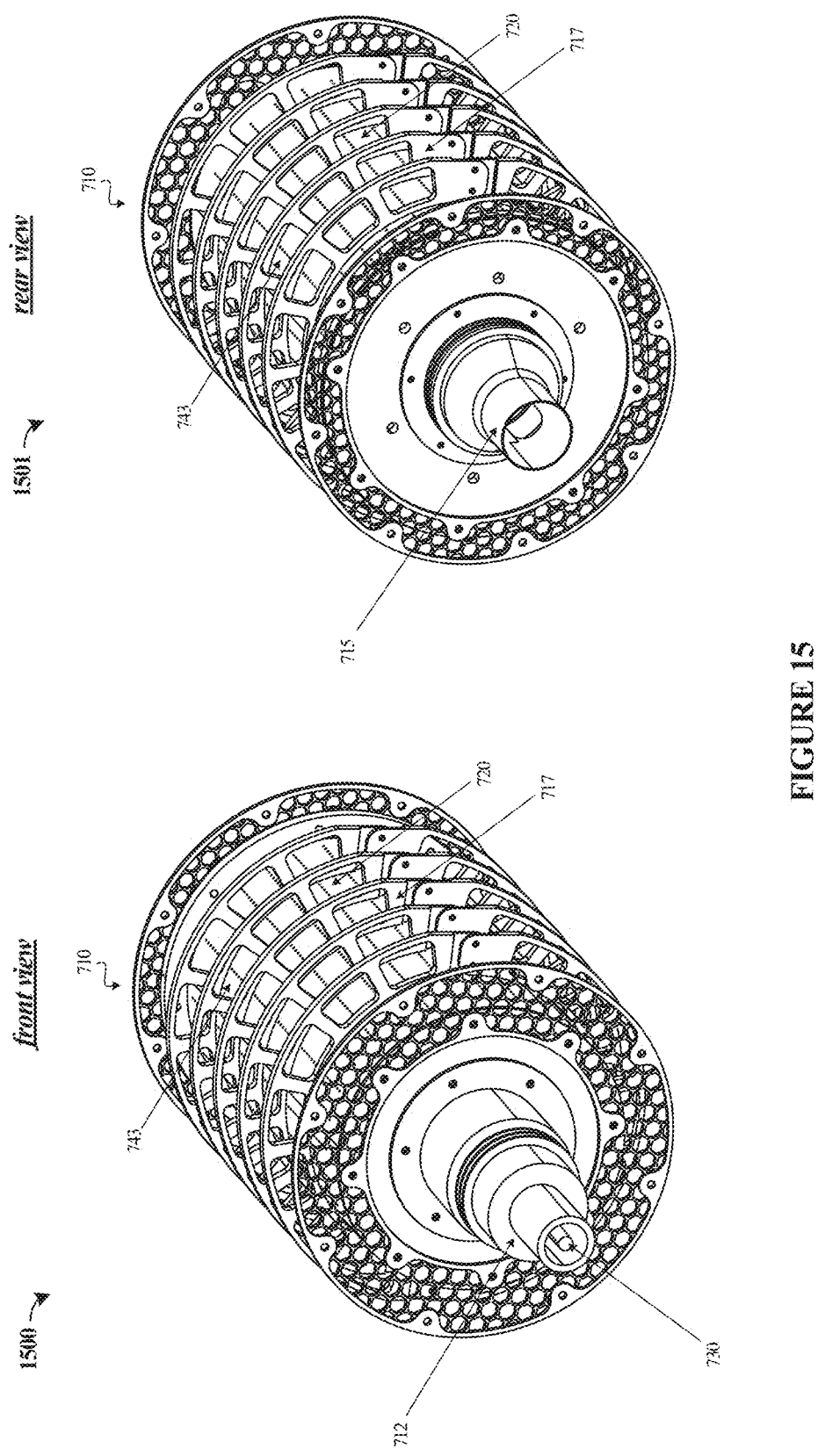
FIG. 15 illustrates views of a fluid reaction apparatus in an implementation.

FIG. 15 includes views 1500 and 1501 that depict reaction apparatus 710. View 1500 is a front internal view of reaction apparatus 710 and view 1501 is a rear internal view of reaction apparatus 710. In these views, the apparatus body 714 is absent revealing support ribs 717 and substrate chamber 720. The open region between substrate chamber 720 and apparatus body 714 forms fluid path 743. Support ribs 717 are interspersed in fluid path 704 and comprise open sections as to not impede fluid flow through path 743.

FIG. 16 includes views 1600 and 1601 that depict leaky RF conduit 712. View 1600 is a front internal view of leaky RF conduit 712 and view 1601 is a rear internal view of leaky RF conduit 712. In these views, central conductor 730, RF windows 731, outer conductor 732, conduit pores 734, spacer elements 735, and RF short 736 are illustrated. The region between outer conductor 732 and central conductor 730 form fluid path 742. RF windows 731 are interspersed along the longitudinal axis of central conductor 730. Spacer elements 735 comprise a spoked shape as to allow fluid to flow through fluid path 742. The outer perimeters of spacer elements 735 also fill RF windows 731 allow RF energy carried by central conductor 730 to leak into annular region 741 external to outer conductor 732. RF short 736 is also seen in view 1601.

Also, FIG. 16 highlights the widths of RF windows 731, which can be configured to sequentially increase in width over the longitudinal extent of leaky RF conduit 712 from an initial width to an increased or final width. Although not required, this increasing width arrangement of RF windows 731 can affect impedance matching of leaky RF conduit 712, ensure that leaky RF conduit 712 is more 'leaky' closer to a terminal end of leaky RF conduit 712 than that of the input end of leaky RF conduit 712, and provide for more even distribution of RF energy within the substrate. In some examples, RF energy leaks through these slots formed from RF windows 731 which are carefully positioned along outer conductor 732 to provide even heating of zeolite during desorption phases.

Figure 17:
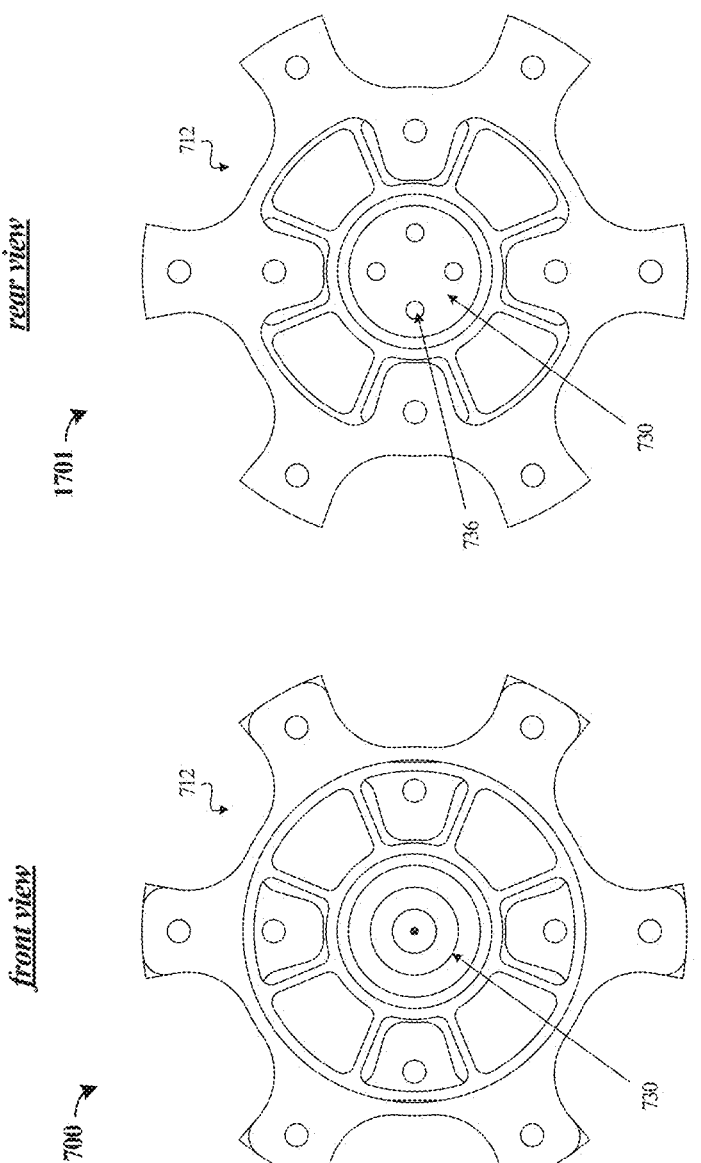
FIG. 17 illustrates views of a fluid reaction apparatus in an implementation.

FIG. 17 includes views 1700 and 1701 that depict leaky RF conduit 712. View 1500 is a front internal view of leaky RF conduit 712 and view 1501 is a rear internal view of leaky RF conduit 712. The front side of leaky RF conduit 712 comprises a connection interface that allows external systems like a transmitter and coaxial cable to connect to conduit 712 and transfer RF energy along central conductor 730. Central conductor 730 terminates at the rear side of leaky RF conduit 712. The rear side of leaky RF conduit 712 comprises RF short 736.

Figure 18:
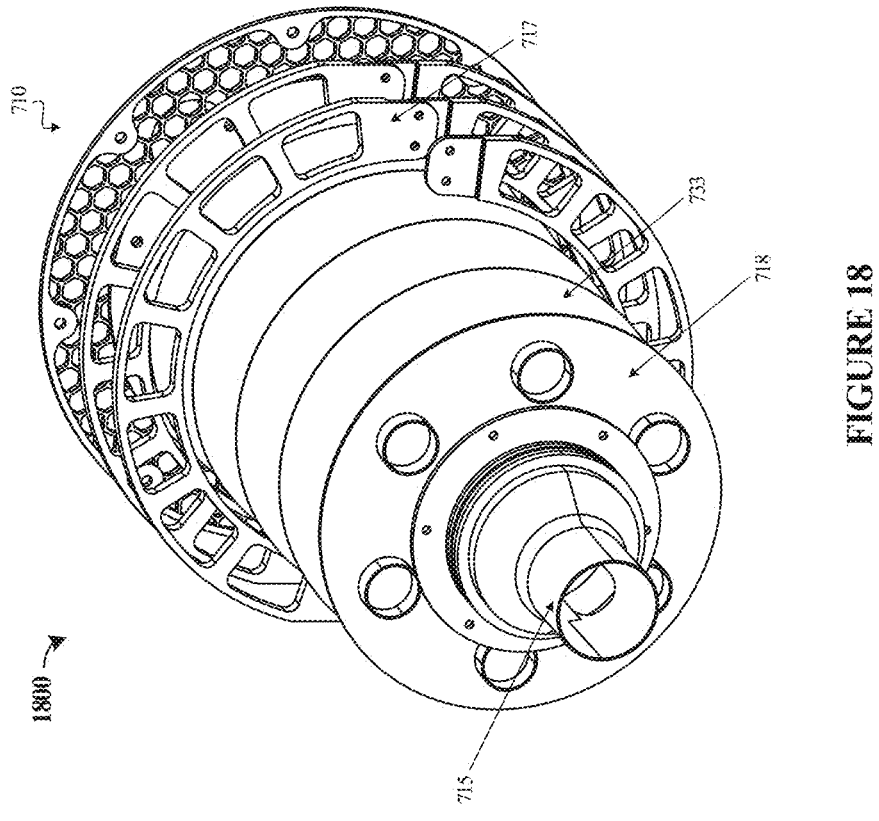
FIG. 18 illustrates a view of a fluid reaction apparatus in an implementation.

FIG. 18 includes view 1800. View 1800 is an internal view of reaction apparatus 710 that illustrates the structural relationship between inlet port 715, pusher 718, RF channelers 733, and support ribs 717. Pusher 718 and RF channelers 733 reside within the diameter of support ribs 717. Support ribs 717 comprise semi-circular rings connected at a central interface.

Figure 19:
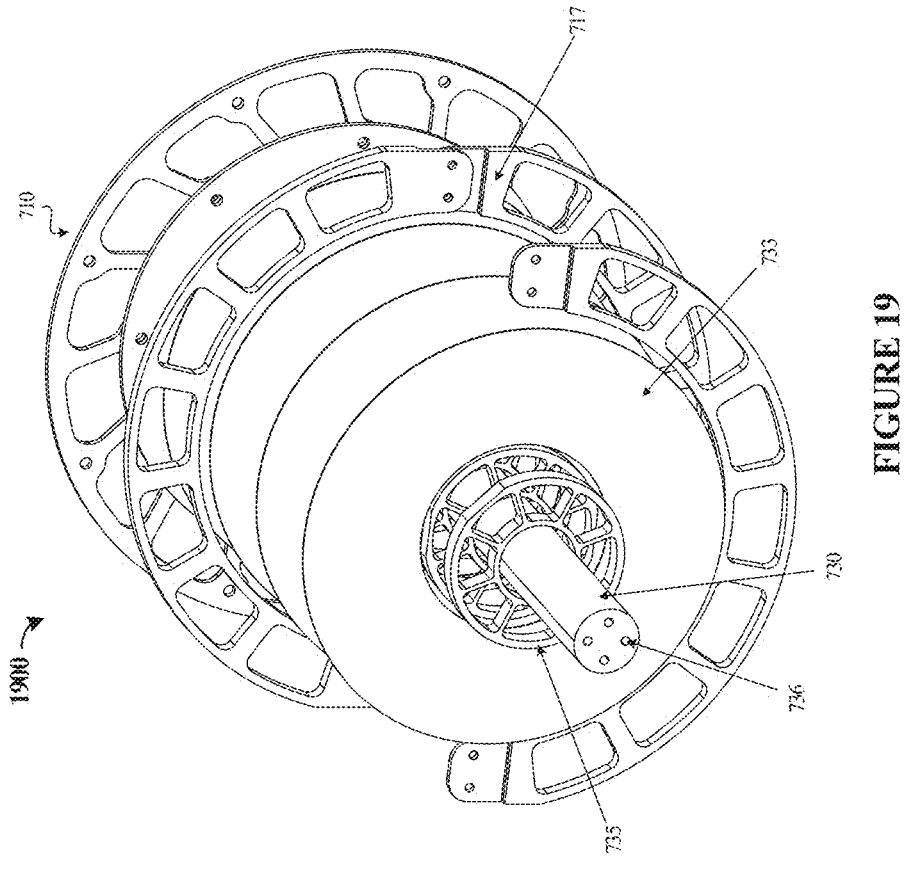
FIG. 19 illustrates a view of a fluid reaction apparatus in an implementation.

FIG. 19 includes view 1900. View 1900 is an internal view of reaction apparatus 710 that illustrates the structural relationship between central conductor 730, spacer elements 735, RF channelers 733, and support ribs 717. Spacer elements 735 comprise a spoked wheel shape and are interspersed along the longitudinal axis of central conductor 730. Central conductor 730 and spacer elements 735 reside within the diameter of RF channelers 733.

Figure 20:
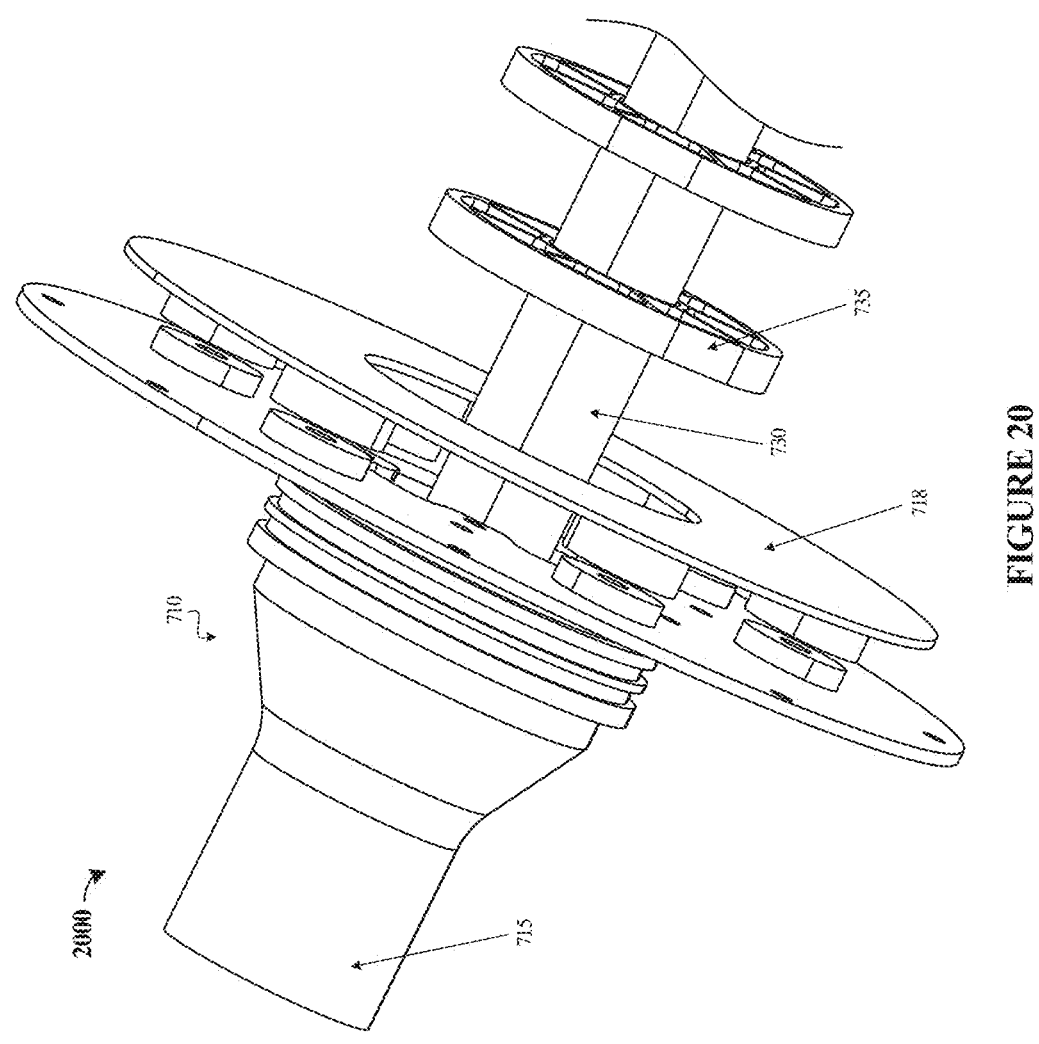
FIG. 20 illustrates a view of a fluid reaction apparatus in an implementation.

FIG. 20 includes view 2000. View 2000 is an internal rear view of reaction apparatus 710 and includes inlet port 715, central conductor 730, spacer elements 735, and pusher 718. Central conductor 730 terminates at an interface with inlet port 715. Inlet fluid may enter via port 715 and pass along central conductor 730 and through the spokes of spacer elements 735.

Figure 21:
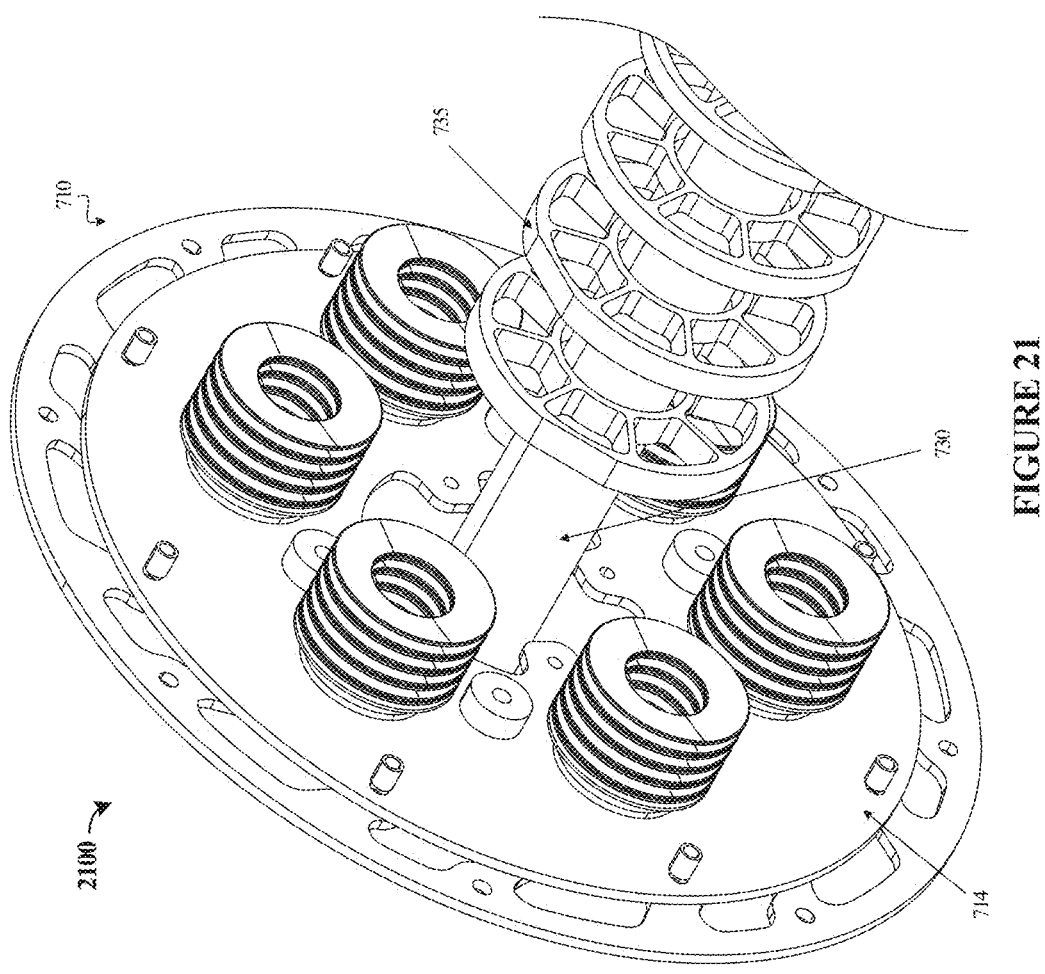
FIG. 21 illustrates a view of a fluid reaction apparatus in an implementation.

FIG. 21 includes view 2100. View 2100 is an internal front view of reaction apparatus 710 and includes leaky RF conduit 712, central conductor 730, spacer elements 735, and a forward endcap of apparatus body 714. RF conduit 712 is configured to connect to an RF source and receive RF energy along central conductor 730. Central conductor 730 leaks the received RF energy radially along the longitudinal axis of leaky RF conduit 712 via RF windows 731 established by spacer elements 735 and outer conductor 732 (not shown).

Figure 22:
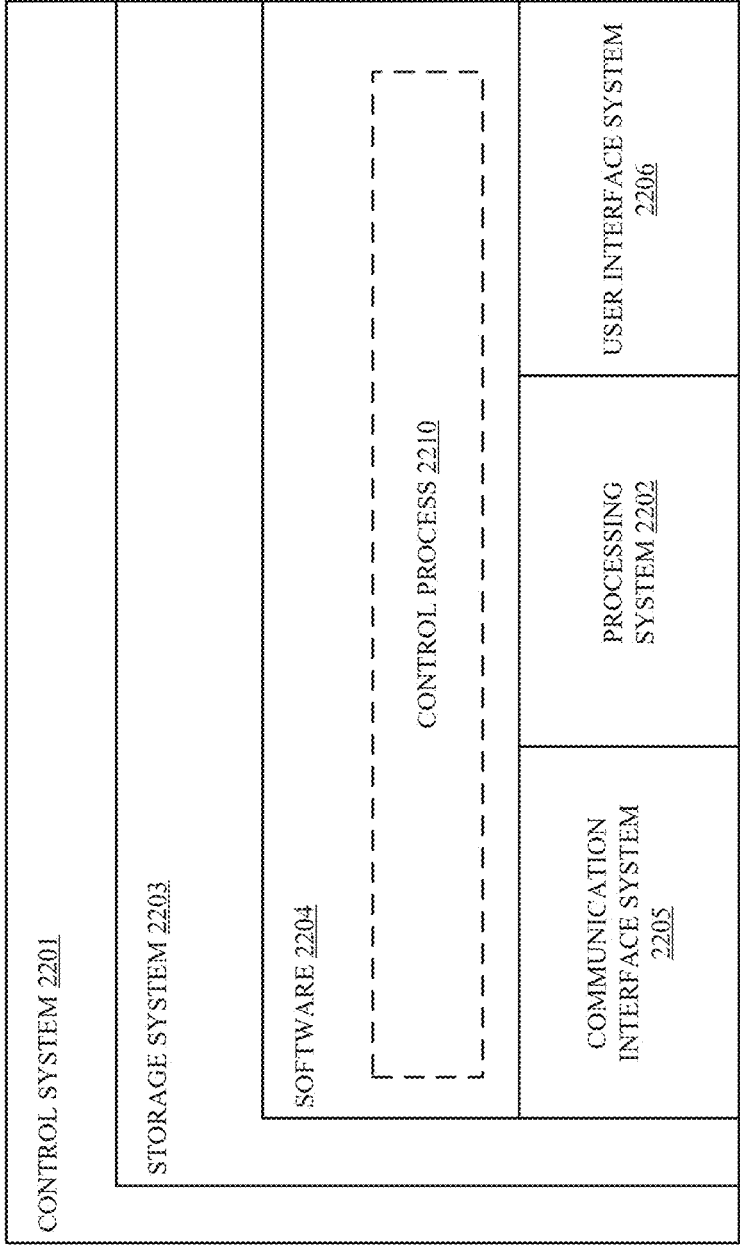
FIG. 22 illustrates a computing device in an implementation.

FIG. 22 illustrates control system 2201 in an implementation. Control system 2201 is representative of any system or collection of systems in which the various operational techniques, architectures, scenarios, and processes disclosed herein may be implemented. For example, control system 2201 can be used to implement a gas separation process of reaction apparatus 101 of FIG. 1. Control system 2201 can implement one or more portions of the operations and process controllers described in FIGS. 4-6 or implement process control features for any of the included Figures, including fluid control processes, reaction control processes, interaction control processes, RF control processes, measurement, monitoring, reporting, and operator interfacing.

Control system 2201 may be implemented as a single apparatus, system, or device or may be implemented in a distributed manner as multiple apparatuses, systems, or devices. Control system 2201 includes, but is not limited to, processing system 2202, storage system 2203, software 2204, communication interface system 2205, and user interface system 2207. Processing system 2202 is operatively coupled with storage system 2203, communication interface system 2205, and user interface system 2206.

Processing system 2202 loads and executes software 2204 from storage system 2203. Software 2204 includes control process 2210, at least some of which are representative of the operational techniques, algorithms, architectures, scenarios, and processes discussed with respect to the included Figures. When executed by processing system 2202 to control a reaction apparatus to affect designated interaction processes between substrates and fluids like gas separation processes, molecule desorption, and reaction catalysis, software 2204 directs processing system 2202 to operate as described herein for at least the various processes, operational scenarios, and sequences discussed in the foregoing implementations. Control system 2201 may optionally include additional devices, features, or functionality not discussed for purposes of brevity.

Processing system 2202 may comprise a microprocessor and processing circuitry that retrieves and executes software 2204 from storage system 2203. Processing system 2202 may be implemented within a single processing device but may also be distributed across multiple processing devices or sub-systems that cooperate in executing program instructions. Examples of processing system 2202 include general purpose central processing units, application specific processors, graphics processing units, and logic devices, as well as any other type of processing device and supporting circuitry, combinations, or variations thereof.

Storage system 2203 may comprise any tangible computer readable storage media readable by processing system 2202 and capable of storing software 2204. Storage system 2203 may include volatile and nonvolatile, removable and non-removable media implemented in any method or technology for storage of information, such as computer readable instructions, data structures, control programs, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 2203 may also include computer readable communication media over which at least some of software 2204 may be communicated internally or externally. Storage system 2203 may be implemented as a single storage device but may also be implemented across multiple storage devices or sub-systems co-located or distributed relative to each other. Storage system 2203 may comprise additional elements, such as a controller, capable of communicating with processing system 2202 or possibly other systems.

Software 2204 may be implemented in program instructions and among other functions may, when executed by processing system 2202, direct processing system 2202 to operate as described with respect to the various operational scenarios, sequences, and processes illustrated herein. For example, software 2204 may include program instructions comprising control process 2210 to implement process 400 illustrated in FIG. 4, process 500 illustrated in FIG. 5, and/or process 600 illustrated in FIG. 6. In particular, the program instructions may include various components or modules that cooperate or otherwise interact to carry out the various processes and operational scenarios described herein. The various components or modules may be implemented in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 2204 may include additional processes, programs, or components, such as operating system software or other application software, in addition to or that include control process 2210. Software 2204 may also comprise firmware or some other form of machine-readable processing instructions executable by processing system 2202.

Software 2204, when loaded into processing system 2202 and executed, may transform a suitable apparatus, system, or device (of which control system 2201 is representative) overall from a general-purpose computing system into a special-purpose computing system customized to control a reaction apparatus to perform fluid desorption operations, reaction catalysis operations, or any other operation to affect a designated process interaction between a fluid and a substrate using RF energy leakage as contemplated herein. Indeed, encoding software 2204 on storage system 2203 may transform the physical structure of storage system 2203. The specific transformation of the physical structure may depend on various factors in different implementations of this description. Examples of such factors may include, but are not limited to, the technology used to implement the storage media of storage system 2203 and whether the computer-storage media are characterized as primary or secondary storage, as well as other factors. For example, if the computer-readable storage media are implemented as semiconductor-based memory, software 2204 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 2205 may include communication connections and devices that allow for communication with other imaging systems, computing systems, or electrical components (not shown) over communication links or communication networks (not shown). Examples of connections and devices that together allow for inter-system communication may include transceivers, network interface controllers, antennas, power amplifiers, RF circuitry, and other communication circuitry. The connections and devices may communicate over communication media to exchange communications with other computing systems or networks of systems, such as metal, glass, air, or any other suitable communication media. Physical or logical elements of communication interface system 2205 can receive process data, operating status, or other data for a reaction apparatus, and provide user commands, control signaling, and other instructions to affect the operation of a reaction apparatus based on the received data. For example, communication interface system 2205 may transfer control signaling to begin gas desorption in a reaction apparatus in response to receiving data indicating substrate breakthrough has occurred.

Communication between control system 2201 and other elements or systems (not shown) via communication interface system 2205 may occur over data links, control links, communication links, or communication networks and in accordance with various communication protocols, combinations of protocols, or variations thereof. For example, control system 2201 when implementing a control process for a reaction apparatus, might transfer control signaling to actuators in the RF apparatus over corresponding digital communication links comprising Ethernet interfaces, serial interfaces, serial peripheral interface (SPI) links, inter-integrated circuit (I2C) interfaces, universal serial bus (USB) interfaces, UART interfaces, or wireless interfaces. When network links are employed, example network topologies include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet Protocol (IP), the transmission control protocol (TCP), and the user datagram protocol (UDP), as well as any other suitable communication protocol, variation, or combination thereof.

User interface system 2206 may include a software or virtual interface such as a terminal interface, command line interface, or application programming interface (API). User interface system 2206 may also include physical user interfaces, such as keyboard, a mouse, a voice input device, or a touchscreen input device for receiving input from a user. User interface system 2206 may include visualization/status interfaces, user command controls, and telemetry, such as user controls, start/stop controls, leaky RF apparatus telemetry like fluid flowrate and temperature, operating mode control interfaces, visualization interfaces, and system characteristic calibration controls, among others to. Output devices such as displays, speakers, web interfaces, terminal interfaces, and other types of output devices may also be included in user interface system 2206. User interface system 2206 may also include associated user interface software executable by processing system 2202 in support of the various user input and output devices discussed above. Separately or in conjunction with each other and other hardware and software elements, the user interface software and user interface devices may support a console user interface, graphical user interface, a natural user interface, or any other type of user interface that characterizes the operation of a leaky RF apparatus.

The illustrations of the embodiments described herein are intended to provide a general understanding of the structure of the various embodiments. While several implementations are described in connection with these illustrations of the embodiments, the disclosure is not limited to the implementations disclosed herein. On the contrary, the intent is to cover all alternatives, modifications, and equivalents. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and illustrations included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus comprising:
a substrate having properties selected to achieve a designated interaction process with a fluid; and
a radio frequency (RF) conduit configured to accept RF energy at an input end as supplied by an RF source, leak the RF energy external to the RF conduit radially along a longitudinal axis through dielectric features on the RF conduit, and energize the substrate with the RF energy to affect the designated interaction process as the fluid, introduced to the substrate through pores on the RF conduit, passes through the substrate via pores on the RF conduit.

2. The apparatus of claim 1, further comprising:
a chamber comprising a chamber wall; and wherein:
the RF conduit comprises a central conductor configured to transfer the RF energy and an outer conductor;
the central conductor is positioned within the outer conductor;
the RF conduit is positioned within the chamber wall of the chamber; and
the substrate is positioned in an annular region between the outer conductor of the RF conduit and the chamber wall of the chamber.

3. The apparatus of claim 2, wherein the outer conductor and the chamber wall are permeable to the fluid and impermeable to the substrate.

4. The apparatus of claim 1, wherein the dielectric features of the RF conduit comprises RF transparent dielectric windows configured to leak the RF energy into the substrate.

5. The apparatus of claim 1, further comprising:
RF channelers configured to disperse the RF energy within the substrate.

6. The apparatus of claim 1, further comprising:
a pusher configured to compress the substrate to reduce movement of the substrate over temperature changes in the substrate from the RF energy.

7. The apparatus of claim 1,
wherein the substrate comprises molecular sieves configured to adsorb a target component from the fluid; and
wherein the RF conduit is configured to leak the RF energy external to the RF conduit radially along the longitudinal axis and energize the molecular sieves to desorb a target component of the fluid from the substate.

8. The apparatus of claim 1,
wherein the fluid comprises air;
wherein the substrate comprises a zeolite configured to adsorb carbon dioxide from the air; and
wherein the RF conduit is configured to leak the RF energy external to the RF conduit radially along the longitudinal axis and energize the zeolite to desorb the carbon dioxide from the substate.

9. The apparatus of claim 8, wherein the RF conduit is configured to leak the RF energy external to the RF conduit and excite bonds between sodium ions of the zeolite and the carbon dioxide to desorb the carbon dioxide.

10. The apparatus of claim 1 wherein the fluid comprises chemical reactants;

wherein the substrate comprises a catalyst configured to catalyze a chemical reaction between the chemical reactants to form a reaction product; and wherein the RF conduit configured to leak the RF energy external to the RF conduit radially along the longitudinal axis and energize the catalyst to initiate the chemical reaction.

11. A method comprising:

passing a fluid through a substrate that has properties selected to achieve a designated interaction process with the fluid;

accepting radio frequency (RF) energy as supplied by an RF source at an input end of an RF conduit; and emitting the RF energy through dielectric features of an outer conductor of the radio frequency (RF) conduit radially along a longitudinal axis of the RF conduit to energize the substrate with the RF energy to affect the designated interaction process as the fluid, introduced to the substrate through pores on the outer conductor of the RF conduit, passes through the substrate via pores on the RF conduit.

12. The method of claim 11, wherein:

the substrate and RF conduit are positioned in a chamber;

the RF conduit comprises a central conductor and the outer conductor, the central conductor positioned within the outer conductor; and the substrate is positioned in an annular region between the outer conductor and a chamber wall of the chamber; and further comprising:

passing the fluid through the outer conductor, the substrate, and the chamber wall to achieve the designated interaction process with a fluid; and leaking the RF energy through the outer conductor to energize the substrate to affect the designated interaction process as the fluid passes through the substrate via the pores on the RF conduit.

13. The method of claim 12, wherein the outer conductor and the chamber wall are permeable to the fluid and impermeable to the substrate.

14. The method of claim 11, wherein:

the substrate comprises molecular sieves;

passing the fluid through the substrate comprises passing the fluid through the molecular sieves to adsorb a target component of the fluid; and leaking the RF energy comprises leaking the RF energy from the RF conduit radially along the longitudinal axis to desorb the target component of the fluid from the substrate.

15. The method of claim 11, wherein:

the fluid comprises air;

the substrate comprises a zeolite;

passing the fluid through the substrate comprises passing the fluid through the zeolite to adsorb carbon dioxide from the air; and leaking the RF energy comprises leaking the RF energy from the RF conduit radially along the longitudinal axis to desorb the carbon dioxide from the substrate.

16. The method of claim 15, wherein leaking the RF energy from the RF conduit radially along the longitudinal axis to desorb the carbon dioxide comprises leaking the RF energy to excite bonds between sodium ions of the zeolite and the carbon dioxide to desorb the carbon dioxide.

17. The method of claim 11, wherein:

the fluid comprises chemical reactants;

the substrate comprises a catalyst;

passing the fluid through the substrate comprises passing the fluid through the catalyst to catalyze a chemical reaction between the chemical reactants to form a reaction product; and leaking the RF energy comprises leaking the RF energy from the RF conduit radially along the longitudinal axis to heat the catalyst and the chemical reactants to initiate the chemical reaction.

18. A system, comprising:

a substrate having a longitudinal axis and a radial thickness;

a coaxial radio frequency (RF) conduit disposed within the substrate along the longitudinal axis, and having comprising an input end configured to accept RF energy as supplied by an RF source, pores configured to pass a fluid into the substrate, and dielectric features of configured to leak the RF energy radially into the substrate;

a controller configured to introduce a fluid into an end of the coaxial RF conduit for penetration through the coaxial RF conduit and into the radial thickness of the substrate, wherein the fluid interacts with the substrate when energized with the RF energy to alter composition of the fluid; and the controller configured to detect a saturation threshold condition of the substrate with respect to the fluid, and responsively initiate an RF energizing of the substrate by way of a radial RF emission from the coaxial RF conduit and reduce the saturation threshold condition of the substrate.

19. The system of claim 18, wherein the substate comprises a zeolite material configured to adsorb at least carbon dioxide from the fluid.

20. The system of claim 19, wherein reducing the saturation threshold condition of the substrate comprises desorbing the carbon dioxide from the zeolite.

* * * * *